United States Patent
Chundi et al.

(10) Patent No.: US 12,520,006 B2
(45) Date of Patent: Jan. 6, 2026

(54) SYSTEMS AND METHODS FOR ADAPTIVELY MODIFYING PRESENTATION OF MEDIA CONTENT

(71) Applicant: Adeia Guides Inc., San Jose, CA (US)

(72) Inventors: Charishma Chundi, Andhra Pradesh (IN); Vikram Makam Gupta, Karnataka (IN); Vishwas Sharadanagar Panchaksharaiah, Tiptur (IN); Rajendra Pandey, Karnataka (IN); Susanto Sen, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/625,368

(22) Filed: Apr. 3, 2024

(65) Prior Publication Data

US 2024/0334007 A1    Oct. 3, 2024

Related U.S. Application Data

(63) Continuation of application No. 18/135,804, filed on Apr. 18, 2023, now Pat. No. 11,956,500, which is a continuation of application No. 17/573,810, filed on Jan. 12, 2022, now Pat. No. 11,665,393, which is a continuation of application No. 16/804,455, filed on Feb. 28, 2020, now Pat. No. 11,259,081.

(51) Int. Cl.
| | |
|---|---|
| *H04N 21/4402* | (2011.01) |
| *H04N 21/442* | (2011.01) |
| *H04N 21/485* | (2011.01) |
| *H04N 21/845* | (2011.01) |

(52) U.S. Cl.
CPC .......... *H04N 21/440263* (2013.01); *H04N 21/44218* (2013.01); *H04N 21/4854* (2013.01); *H04N 21/4858* (2013.01); *H04N 21/8456* (2013.01)

(58) Field of Classification Search
CPC ..... H04N 21/440263; H04N 21/44218; H04N 21/4854; H04N 21/4858; H04N 21/8456
See application file for complete search history.

(56) References Cited

U.S. PATENT DOCUMENTS

| | | |
|---|---|---|
| 7,536,650 B1 | 5/2009 | Robertson et al. |
| 10,063,911 B1 | 8/2018 | Obara et al. |

(Continued)

FOREIGN PATENT DOCUMENTS

| | | |
|---|---|---|
| EP | 2204275 A1 | 7/2010 |
| EP | 3547079 A1 | 10/2019 |

(Continued)

OTHER PUBLICATIONS

PCT International Search Report for International Application No. PCT/US2020/067262, dated Apr. 8, 2021 (13 pages).

*Primary Examiner* — Kyu Chae
(74) *Attorney, Agent, or Firm* — HALEY GUILIANO LLP

(57) ABSTRACT

Presentation of content on a display device is adaptively modified based on the apparent size of a content area in which the content is presented. A distance between the first user and the display device is determined, as well as an actual size of the content area in which the content is being presented. Based on the distance and the actual size of the content area, an apparent size of the content area is calculated, and presentation of the content is modified based on the apparent size of the content area.

20 Claims, 20 Drawing Sheets

(56) References Cited

U.S. PATENT DOCUMENTS

| | | |
|---|---|---|
| 11,259,081 B2 * | 2/2022 | Chundi ............. H04N 21/4858 |
| 11,665,393 B2 * | 5/2023 | Chundi .......... H04N 21/440263 |
| | | 725/12 |
| 11,956,500 B2 * | 4/2024 | Chundi ............. H04N 21/4858 |
| 2009/0153649 A1 | 6/2009 | Hirooka et al. |
| 2009/0164896 A1 * | 6/2009 | Thorn ................... G06F 1/1686 |
| | | 715/700 |
| 2009/0201314 A1 | 8/2009 | Tanaka et al. |
| 2010/0150451 A1 | 6/2010 | Chae et al. |
| 2011/0271227 A1 | 11/2011 | Takahashi |
| 2011/0298980 A1 * | 12/2011 | Adhikari ............ H04N 21/4312 |
| | | 725/38 |
| 2011/0299832 A1 | 12/2011 | Butcher |
| 2012/0092378 A1 | 4/2012 | Beck et al. |
| 2013/0027614 A1 | 1/2013 | Bayer et al. |
| 2013/0235073 A1 | 9/2013 | Jaramillo et al. |
| 2013/0329966 A1 * | 12/2013 | Hildreth ............. H04N 21/4751 |
| | | 382/115 |
| 2014/0372894 A1 | 12/2014 | Pandy et al. |
| 2015/0103003 A1 | 4/2015 | Kerr et al. |
| 2015/0170333 A1 | 6/2015 | Jing et al. |
| 2015/0244830 A1 | 8/2015 | Rietveld et al. |
| 2015/0264241 A1 * | 9/2015 | Kleekajai ............ H04N 23/667 |
| | | 348/227.1 |
| 2015/0309565 A1 | 10/2015 | Beri et al. |
| 2016/0078593 A1 | 3/2016 | Mesguich Havilio |
| 2016/0140092 A1 | 5/2016 | Gondo et al. |
| 2016/0156983 A1 | 6/2016 | Vong et al. |
| 2016/0231809 A1 | 8/2016 | Yasuda et al. |
| 2016/0349970 A1 * | 12/2016 | Everitt ................ G06F 3/04883 |
| 2017/0127011 A1 * | 5/2017 | Okajima .................. G09G 5/14 |
| 2018/0053280 A1 | 2/2018 | Kim et al. |
| 2018/0070011 A1 | 3/2018 | Seo |
| 2018/0122130 A1 | 5/2018 | Kim et al. |
| 2018/0158171 A1 | 6/2018 | Kim et al. |
| 2018/0300034 A1 | 10/2018 | Taylor |
| 2019/0220500 A1 * | 7/2019 | Dhaundiyal ............ G06F 3/048 |
| 2019/0304060 A1 | 10/2019 | Sial et al. |
| 2021/0274250 A1 | 9/2021 | Chundi et al. |
| 2022/0132207 A1 | 4/2022 | Chundi et al. |
| 2023/0254534 A1 | 8/2023 | Chundi et al. |

FOREIGN PATENT DOCUMENTS

| | | |
|---|---|---|
| FR | 2980067 A1 | 3/2013 |
| GB | 2566276 A | 3/2019 |
| JP | 2000276277 A | 10/2000 |
| JP | 2009-192737 A | 8/2009 |
| JP | 2014-048775 A | 3/2014 |
| JP | 2019-153145 A | 9/2019 |
| KR | 10-2016-0080875 A | 7/2016 |
| WO | 2015035247 A1 | 3/2015 |
| WO | 2018152437 A1 | 8/2018 |
| WO | 2019048820 A1 | 3/2019 |

* cited by examiner

SYSTEMS AND METHODS FOR ADAPTIVELY MODIFYING PRESENTATION OF MEDIA CONTENT

CROSS-REFERENCE TO RELATED APPLICATION

This application is a continuation of U.S. patent application Ser. No. 18/135,804, filed Apr. 18, 2023, which is a continuation of U.S. patent application Ser. No. 17/573,810, filed Jan. 12, 2022, now U.S. Pat. No. 11,665,393 which is a continuation of U.S. patent application Ser. No. 16/804,455, filed Feb. 28, 2020, now U.S. Pat. No. 11,259,081, the disclosures of which are hereby incorporated by reference herein in their entireties.

BACKGROUND

The present disclosure relates to content presentation systems and, more particularly, modifying presentation of content based on the apparent size of a display screen.

SUMMARY

Content is increasingly being consumed using different devices and in different settings. Many users watch video content on smartphones, tablets, or other mobile devices more frequently than on a television or other large screen display device. The aspect ratio of a typical device with a rectangular display is 16:9. The size of a display area is often defined as the diagonal distance between corners of the rectangular shape. When consuming content on a mobile device, a user may hold the mobile device at varying distances from his or her eyes under different circumstances, and the distance may change over time as the user consumes content. When users consume content on a television, they may not be sitting directly in front of the screen and may move around the room while consuming the content. Thus, the apparent size of the screen may change as the user's distance from the screen changes. This results in a viewing experience in which the user's ability to see clearly what is happening in the content may vary with the distance from the screen.

Systems and methods are described herein for adaptively modifying presentation of content in relation to a display device. The content is presented in a content area or display region associated with the display device, such as a media player window, which may not occupy the entire screen. A distance between the first user and the display device is determined, as well as an actual size of the content area in which the content is being presented. This may be based on one or more dimensions of the content area. Based on the distance and the actual size of the content area, an apparent size of the content area is calculated, and presentation of the content is modified based on the apparent size of the content area. In some embodiments, modifying presentation of the content involves modifying a zoom level of the content in the content area in which the content is being displayed, such that the user's distance from the screen is compensated for by enlarging the content presented. The amount by which the zoom level is modified may be inversely related to the distance, or the apparent size of the content area. In effect, the distance is used to adjust the apparent size of the content area in the user's field of view.

In some embodiments a ratio between the zoom level and the apparent size of the content area is calculated. When a change in distance between the user and the display device is detected, a new distance between the user and the display device is determined, and a new apparent size is calculated. The zoom level of the content is then modified by an amount determined to maintain the ratio between the zoom level and the apparent size of the content area.

The zoom level of the content may be modified by comparing the apparent size of the content area or display region, for example, based on one or more of the dimensions of the content area and the user's distance from the display device, to a first threshold size. If the apparent size is larger than or equal to the first threshold size, the zoom level of the content in the content area is set to a default zoom level. If, however, the apparent size is smaller than the first threshold size, then a difference between the apparent size and the first threshold size is determined and the zoom level is increased by a zoom factor corresponding to the difference. Increasing the zoom level may involve determining a zoom level at which the apparent size of the content area matches the actual size of the content area and modifying the zoom level of the content in the content area by the zoom factor.

The apparent size of the content area may further be compared to a second threshold size that is smaller than the first threshold size. If the apparent size is smaller than the second threshold size, the content is panned within the content area. Panning the content may involve identifying a spatial portion of the content containing a current focus of the content and generating for display the spatial portion of the content in the content area. A zoom factor at which the spatial portion of the content fills more of the content area may further be determined, and the zoom level of the content is then modified by the zoom factor.

Identifying a spatial portion of the content containing a current focus of the content may be accomplished by identifying a plurality of entities displayed in the content and determining, for each entity of the plurality of entities, a timestamp in the content at which the respective entity is the focus of the content. A current timestamp of the content is monitored and, if the current timestamp matches a timestamp at which a respective entity of the plurality of entities is the focus of the content, the spatial portion of the content in which the respective entity is displayed is selected.

In some embodiments, modifying the zoom level of the content may be accomplished by identifying a plurality of entities displayed in the content and determining a respective importance level for each entity of the plurality of entities. A subset of entities of the plurality of entities having an importance level that is higher than an importance threshold is then selected, and a set of coordinates describing a position and dimensions, such as a width and a height, of each entity of the subset of entities is determined. A minimum spatial portion of the content that contains every entity of the subset of entities is identified, and a zoom factor at which the minimum spatial portion of the content fills more of the content area is determined. The zoom level of the content in the content area is then modified by the zoom factor.

One way to accomplish modifying presentation of the content based on the apparent size is to determine a maximum size of the content area, determine a current apparent size of the content area, and compare the maximum size with the current size. If the current size of the content area is smaller than the maximum size of the content area, then a size of the content area at which the apparent size of the content area matches the actual size of the content area may be determined. The size of the content area is then increased to the determined size, and a zoom level of the content in the content area is modified by a zoom factor corresponding to the increased size of the content area. If the current size of the content area is already equal to the maximum size of the content area, then a current focus of the content is determined, and a spatial portion of the content in which the identified entity is displayed is generated for display in the content area. The current focus of the content may be determined by comparing a current timestamp to timestamps at which each entity is the current focus of the content as described above.

Another way to accomplish modifying presentation of the content in the content area based on the apparent size is to determine an ambient brightness level and compare it to a brightness threshold. If the ambient brightness level is below the brightness threshold, then a plurality of entities displayed in the content is identified and a spatial portion of the content in which each respective entity is displayed is determined. An entity of the plurality of entities that is currently the focus of the content is identified, and the brightness of spatial portions of the content in which the identified entity is not currently displayed is reduced.

Sometimes multiple users may be viewing content together on a single display device. In some embodiments, a preference level for each of the users is determined and a preferred user is identified. For example, one user may have a higher preference level than the other users. Presentation of the content is then modified based on the apparent size of the content area to the preferred user. In other embodiments, a respective distance between each user and the display device is determined, and a respective apparent size calculated for each user. Each respective apparent size is then compared to a size threshold, and presentation of the content is modified if the apparent size of the content area to any user is smaller than the size threshold. In some cases, the apparent size of the content area to more than one user may be smaller than the size threshold. If so, the smallest respective apparent size of the content area among the respective apparent sizes for each user is determined and a zoom level of the content is modified by a zoom factor corresponding to the smallest apparent size of the content area. The average apparent size among all the users may also be used.

In some embodiments, where multiple users are watching together, a picture-in-picture (PIP) window may be generated for display. The PIP window may display at least a spatial portion of the content and a zoom level of the content in the PIP window may be modified by a zoom factor corresponding to the apparent size of the PIP window. In other embodiments, the PIP window may display the entire content, while presentation of the content is modified in the main content area based on the apparent size of the content area.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
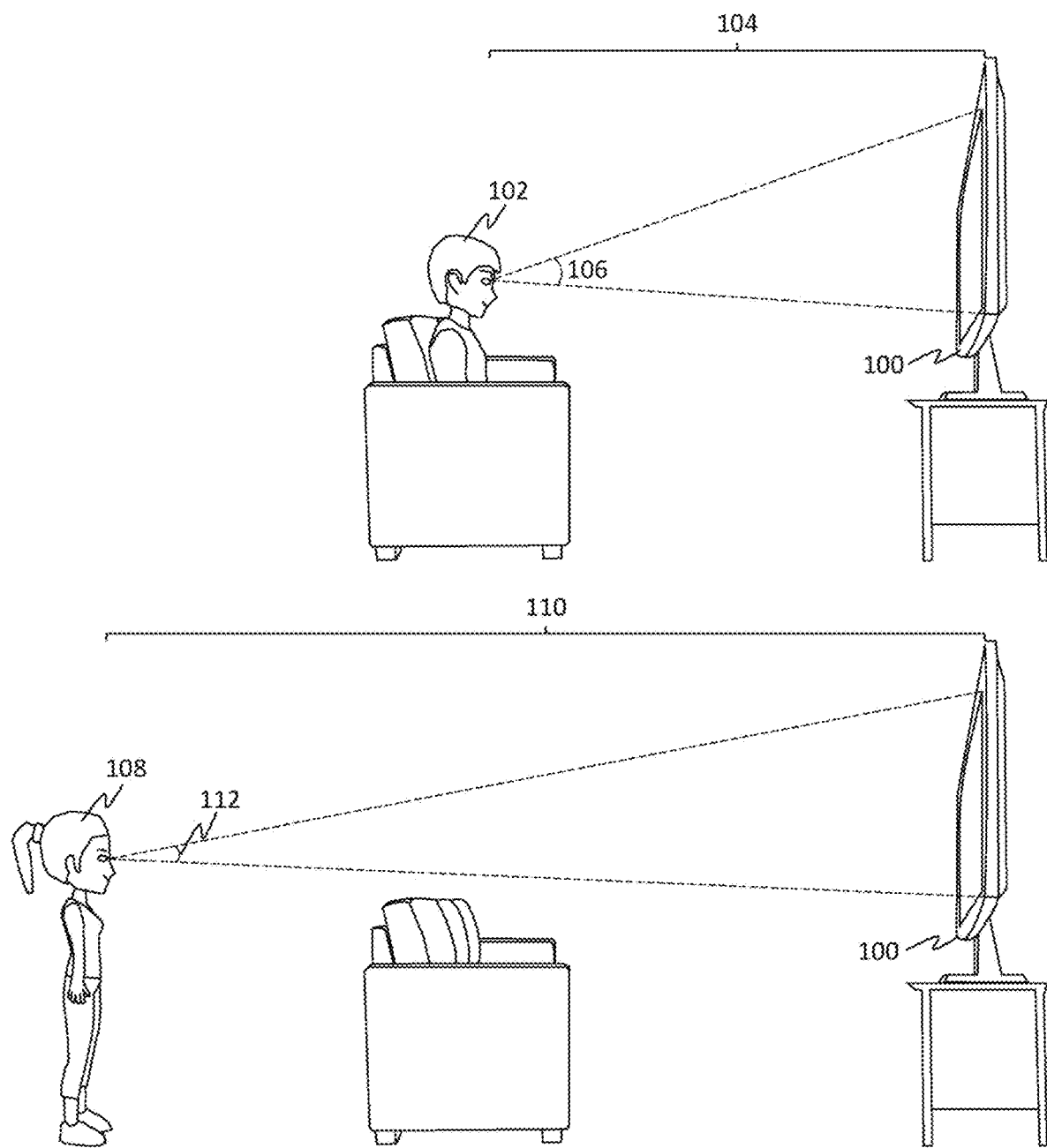
FIG. 1 is an illustrative drawing showing that users at different distances from a display screen perceive different apparent sizes of the display screen, according to some embodiments of the disclosure.

A typical display screen for a display device, such as a television, smartphone, tablet etc. is a rectangle with an aspect ratio of the sides of 16:9. As a user moves closer to or farther from a display screen, the apparent size of the display screen to the user changes but maintains the same shape. As used herein, "apparent size" refers to angular size or visual angle of an object, defined as the portion of a sphere occupied by the object. As a user's distance from an object increases, the dimensions of the object appear to decrease as the proportion of the user's field of vision occupied by that object decreases. This difference is measured as an angle or as an arc length relative to a spherical projection of the user's field of view. FIG. 1 shows a display device 100 and a first user 102 separated by a first distance 104. The apparent size of the display device 100 to the first user 102 is the angle 106 of the field of view of the first user 102 occupied by the display device 100. For a second user 108 separated from display device 100 by a second, larger distance 110, the apparent size of display device 100 to the second user 108 is the angle 112, which is smaller than angle 106.

Figure 2:
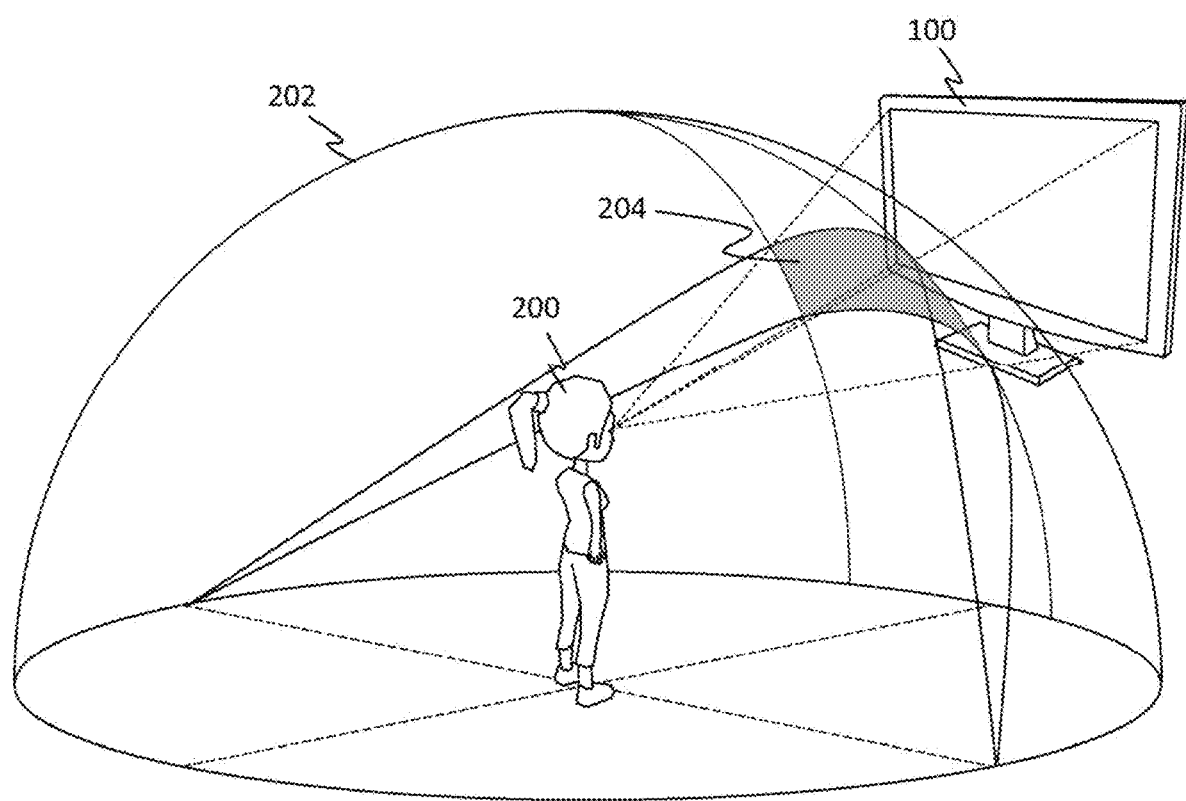
FIG. 2 shows the portion of a user's field of view occupied by a display screen from given distance, according to some embodiments of the disclosure.
Figure 3:
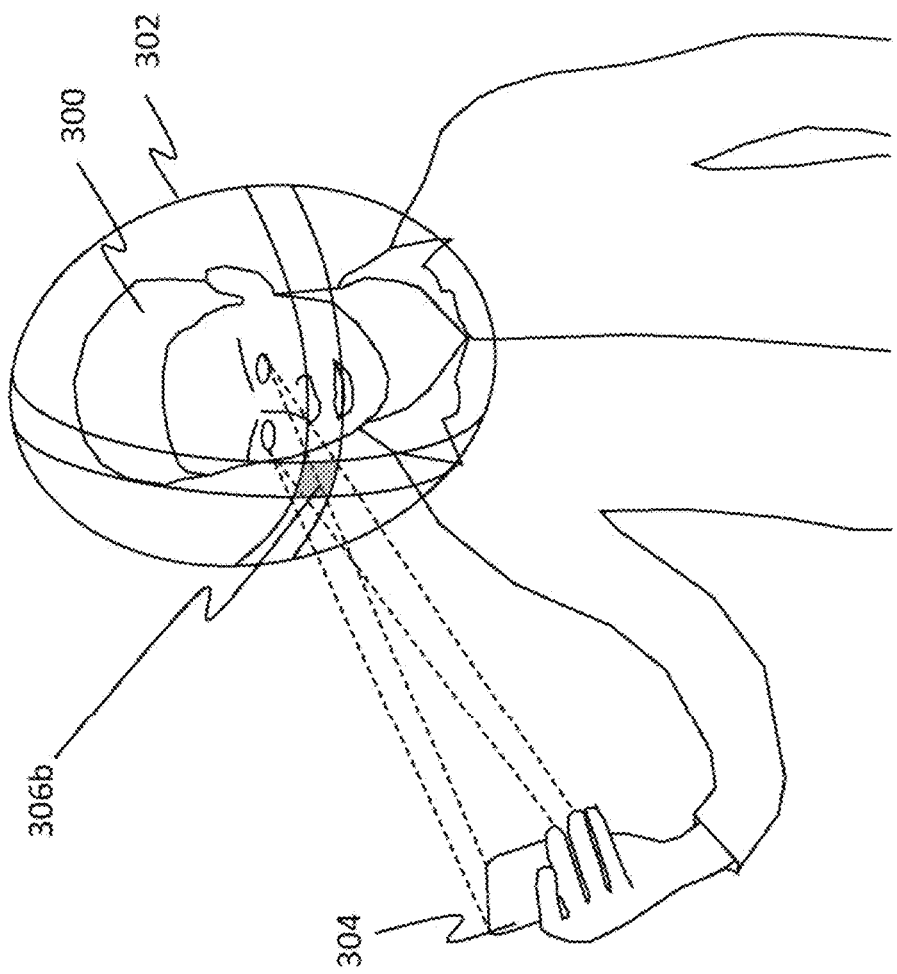
FIG. 3 shows the difference in the portion of a user's field of view occupied by a mobile device when held at different distances from the user, according to some embodiments of the disclosure.
Figure 3:
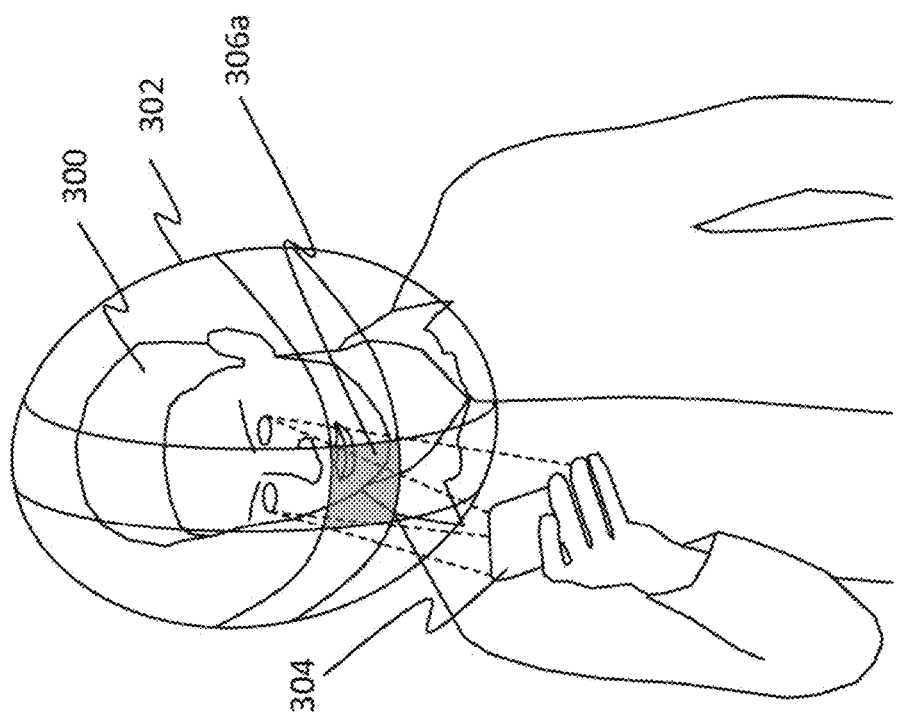

FIG. 2 is a three-dimensional view further illustrating the portion of a user's field of view occupied by display device 100. A user 200 has a field of view 202. The apparent size of display device 100 to user 200 is the solid angle 204, which is a projection of the surface of display device 100 as viewed by user 200 projected onto the spherical field of view 202 of user 200. FIG. 3 shows another three-dimensional view illustrating how the proportion of a user's field of view occupied by a display device decreases as the distance between the user and the display device increases. User 300 has a field of view 302 and is holding a mobile device 304 which includes a rectangular display screen. With mobile device 304 at a close distance to user 300, the apparent size 306a of the mobile device is relatively large, occupying a significant proportion of field of view 302 of user 300. With mobile device 304 at a larger distance from user 300, however, the apparent size 306b of mobile device 304 is much smaller, occupying a reduced proportion of field of view 302 of user 300.

As the apparent size of a display device decreases, i.e., the display content area occupies an increasingly smaller proportion of the field of view, a user's ability to see details in media content decreases. To improve the user's viewing experience, presentation of the content may be modified based on the apparent size of the content as determined by the distance between the user and the device. FIGS. 4-7 illustrate various modifications of presentation of the content in response to decreases in apparent size. While not shown, a person of skill in the art will appreciate that the modifications shown in FIGS. 4-7 and described below can be performed in reverse in response to increases in apparent size at least until the presentation of content returns to its default state.

Figure 4:
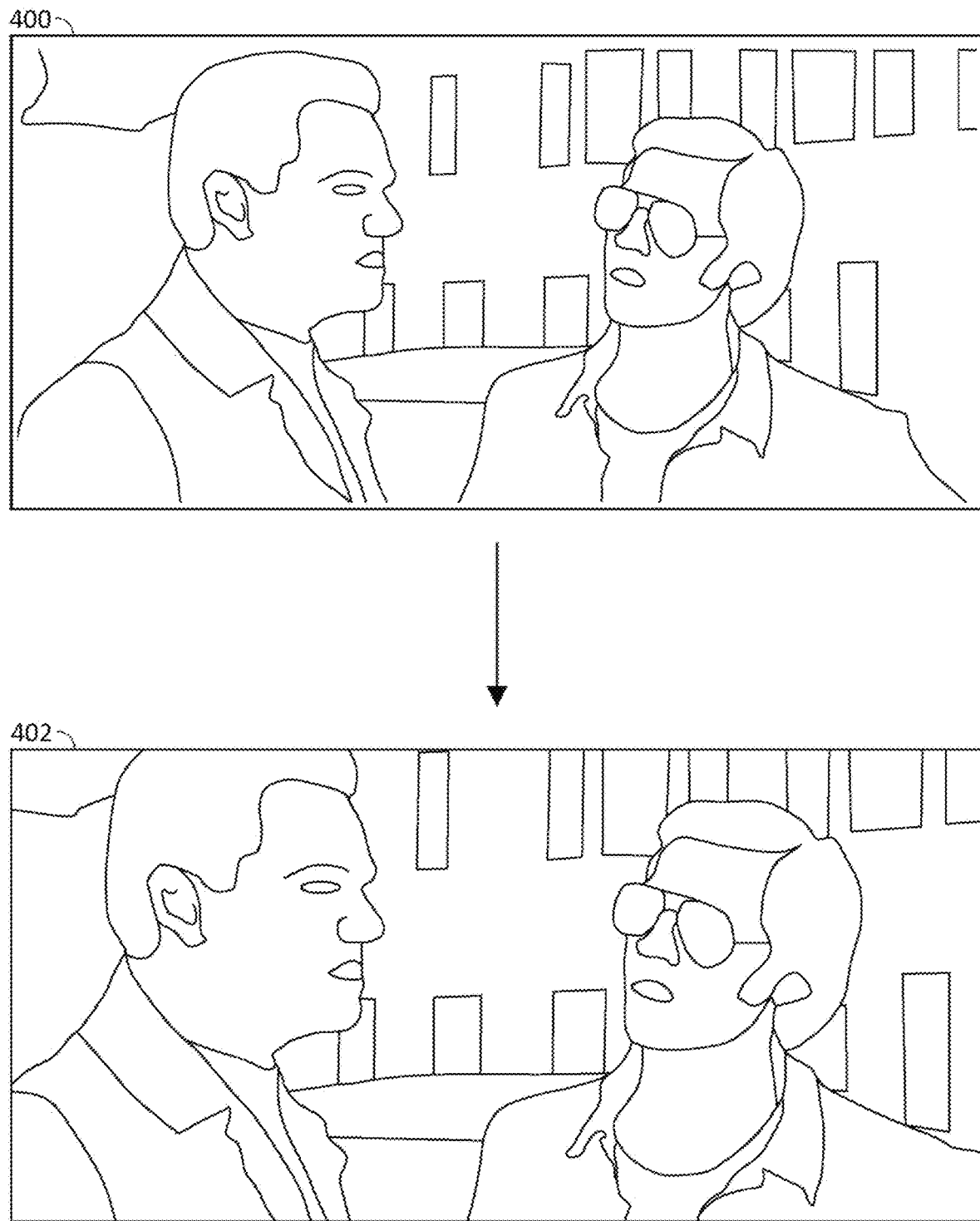
FIG. 4 shows modification of presentation of content by modifying a zoom level of the content, according to some embodiments of the disclosure.
Figure 5:
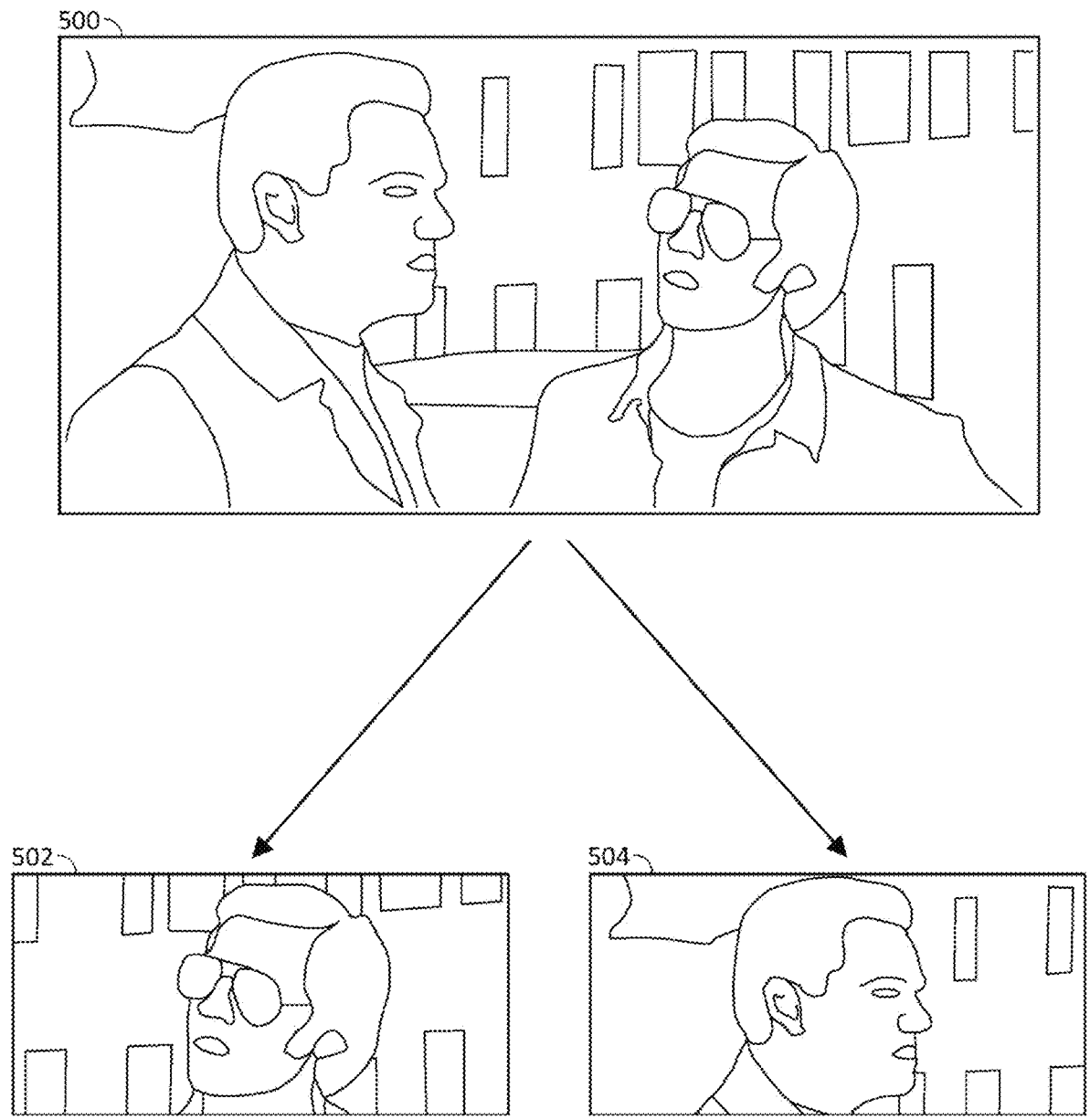
FIG. 5 shows modification of presentation of content by both modifying a zoom level of the content and panning the content to show only the current focus of the content, according to some embodiments of the disclosure.

FIG. 4 shows a first modification of presentation of content. Content 400 is displayed in a content area of a display device. In response to a detected increase in distance between the display device and a user, the apparent size of the content area on the display device is calculated. If the apparent size of the content area is below a threshold size, or below a threshold percentage of the actual size of the content area, then a zoom factor is calculated so that the features in the content occupy a greater proportion of the user's field of view and appear to be bigger. The zoom factor is then applied to the content, and the modified content 402 is then presented in the content area. However, content can be zoomed only a finite amount before video resolution is affected. As illustrated in FIG. 5, presentation of the content can be further modified to pan the content. In other words, spatial portions of the content can be selectively output or cropped to show only the focus of the content at a given time. For example, content 500 showing two characters having a conversation may be displayed in the content area. In response to the apparent size of the content area falling below a second threshold, the content is panned and a first spatial portion 502 is shown when the character depicted in the first spatial portion is speaking, and a second spatial portion 504 is shown when the character depicted in the second spatial portion is speaking.

Figure 6:
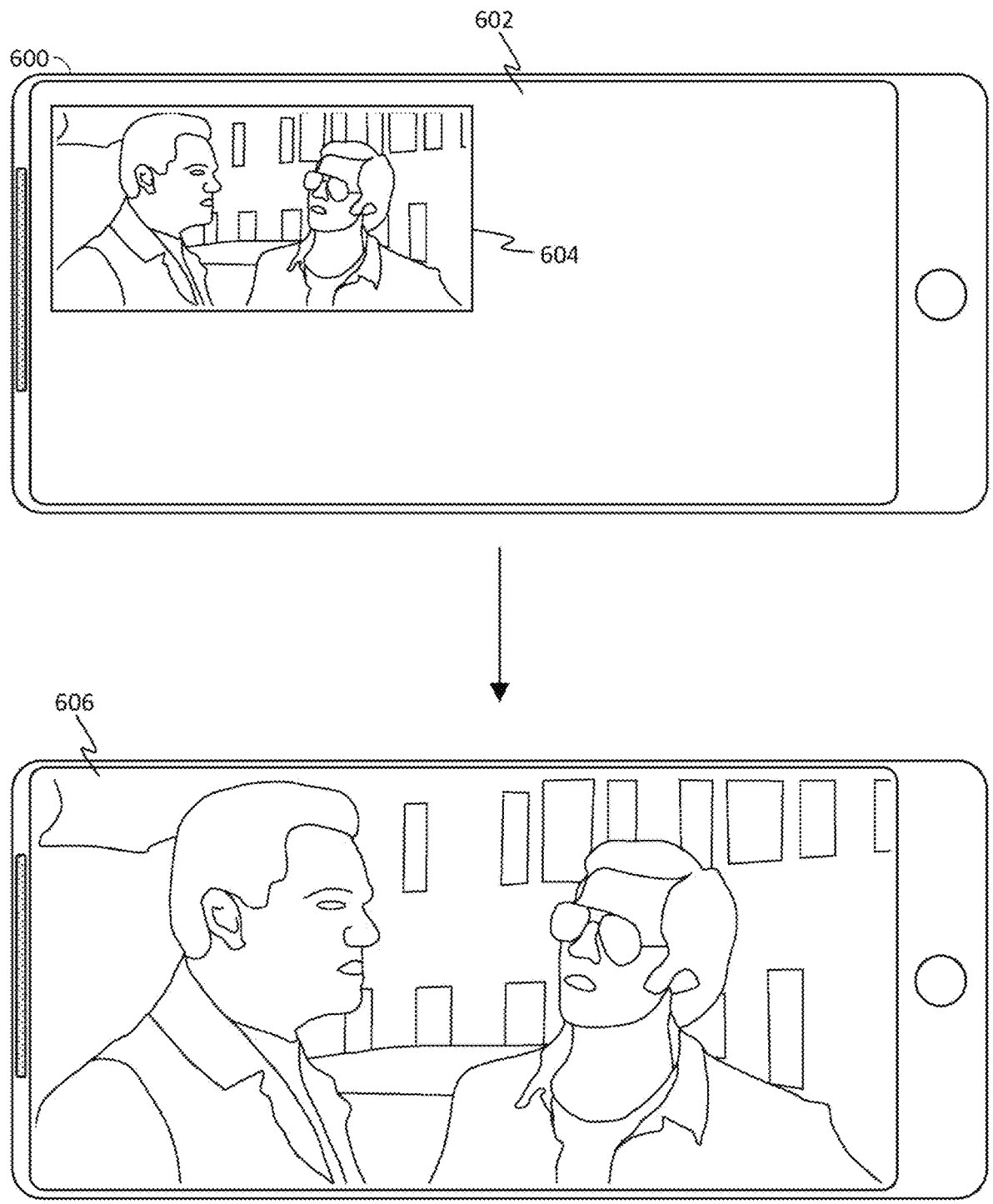
FIG. 6 shows modification of presentation of content by increasing the size of the content area in which the content is displayed, according to some embodiments of the disclosure.

In some cases, the content area may not occupy the entirety of the screen area on the display device. For example, as shown in FIG. 6, display device 600 may be a mobile device. Many mobile devices enable users to multitask by minimizing the area of display screen 602 occupied by a content application (e.g., Netflix, Hulu, YouTube) while interacting with another application. In another example, a user may activate an interactive program guide while watching content on a television, in which the currently playing content is shown in a small area of the screen while the guide is presented in the majority of the screen. If the apparent size of content area 604 is below a threshold size or below a threshold percentage of the actual size of the content area, the size of the content area may be increased 606, and the content zoomed commensurately, to maintain the apparent size of the content area at the actual size of the content area, at least until the content area occupies the entirety of the display screen.

Increasing the size of the content area, and the corresponding zoom operation, may be limited based on the quality of the content. For example, if the content is a high definition (HD) video with a resolution of 1080×720 pixels, a zoom level of 2.5 may begin to distort, pixelate, or otherwise degrade the video of the content. However, if the content is an ultra-high definition (UHD) video, with a resolution of 3840×2160 pixels, the content may still be acceptably clear or undistorted at zoom levels of 2.5 or higher. In the case of streaming content, the quality of the content may change depending on network conditions such as available bandwidth. If a zoom level higher than the maximum zoom level for the quality of the video is required, other modifications of the content may be used in combination with the maximum zoom level.

Figure 7:
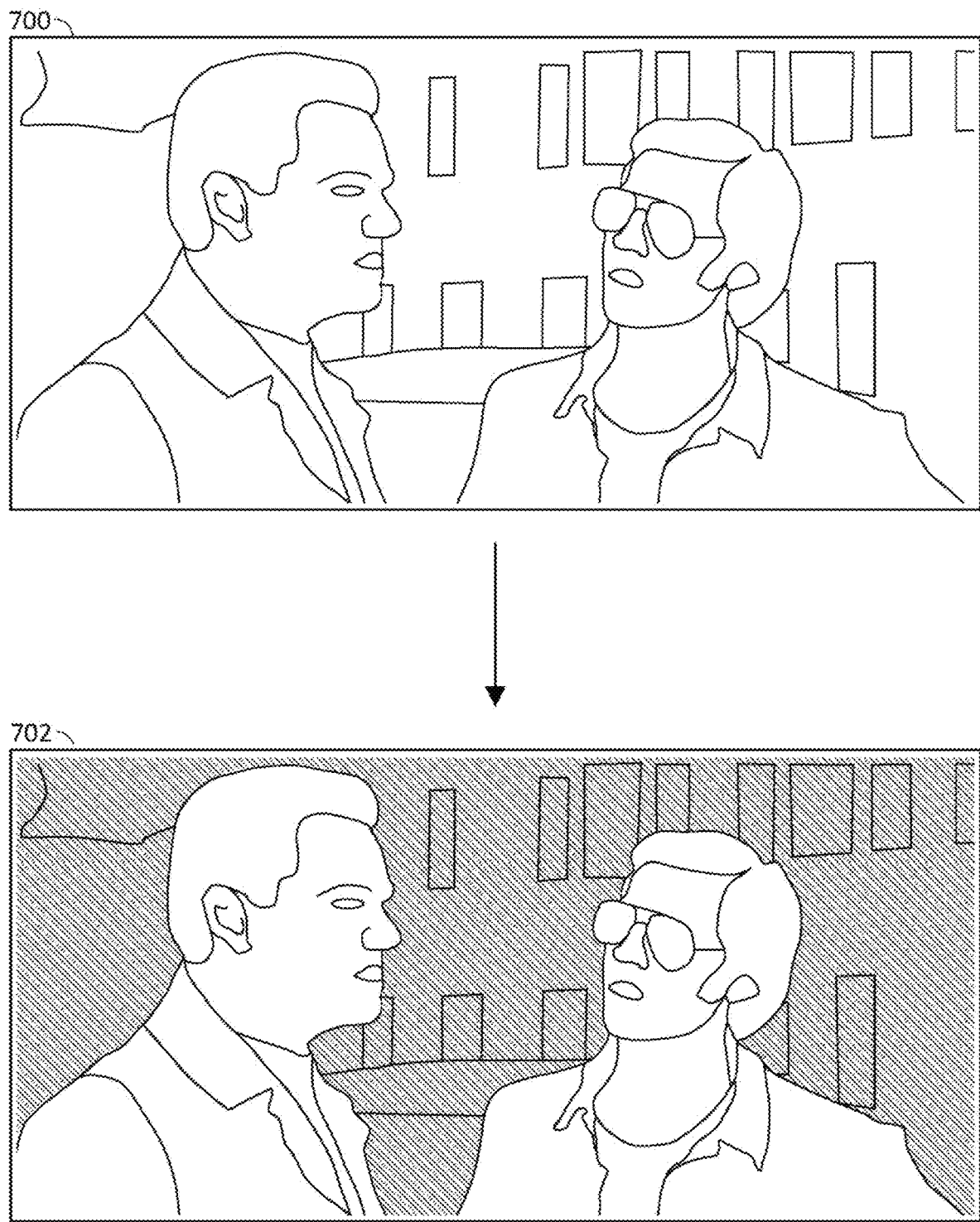
FIG. 7 shows modification of presentation of content by reducing the brightness of portions of the content that are not the focus of the content, according to some embodiments of the disclosure.

In another example, illustrated in FIG. 7, presentation of the content 700 may be modified by reducing the brightness of spatial portions of the content that do not contain the focus of the content. If the apparent size of the content area is below a threshold size or below a threshold percentage of the actual size of the content window, then an ambient brightness level is determined. If the ambient brightness level is below a brightness threshold, then spatial portions of the content containing the current focus of the content are identified and presentation of the content is modified 702 by reducing the brightness of all spatial portions of the content that do not contain the current focus of the content.

Figure 8:
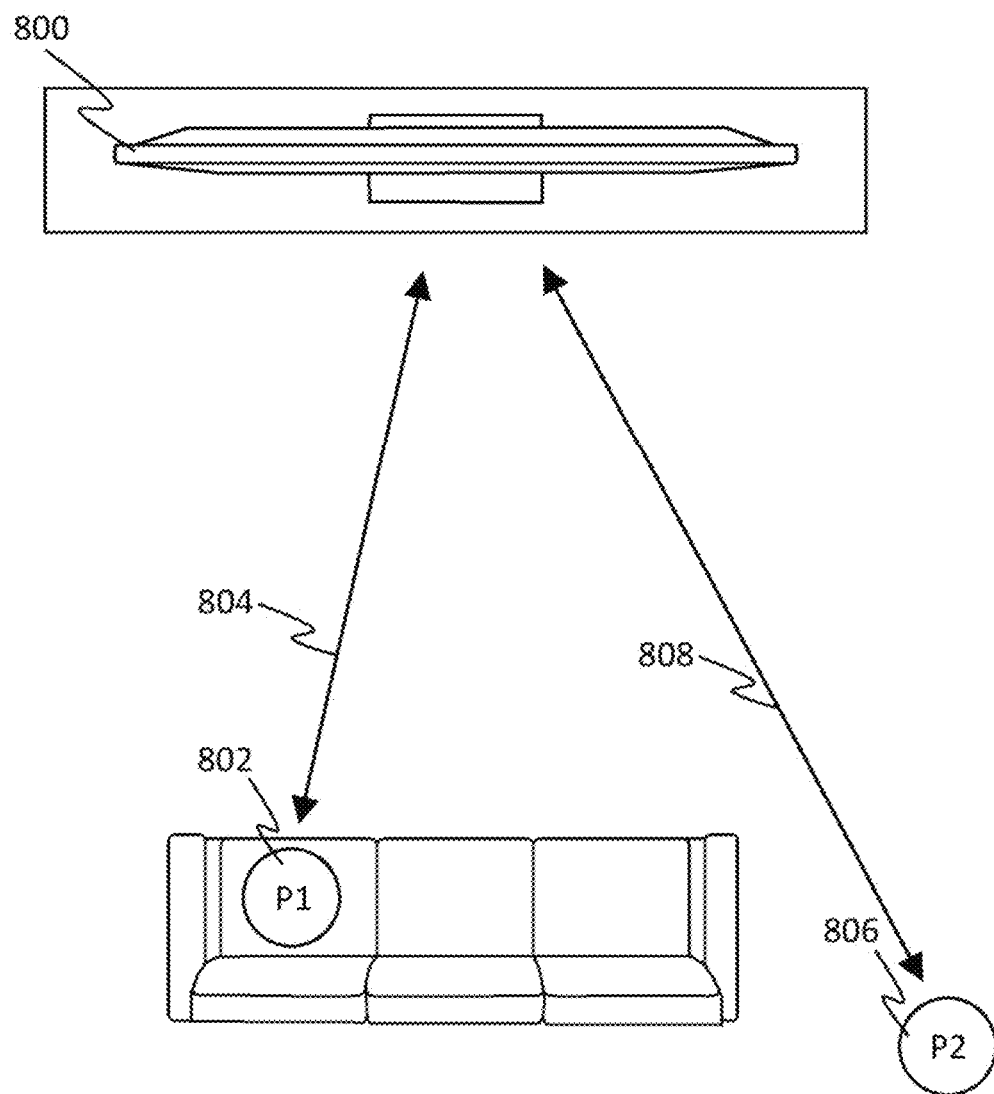
FIG. 8 shows two users watching content on a single display device from different distances, according to some embodiments of the disclosure.

FIG. 8 illustrates an embodiment in which more than one user is watching content simultaneously on a single display device 800. User P1 802 may be positioned at a distance 804 from display device 800, while user P2 806 may be positioned a farther distance 808 from display device 800. Thus, display device 800, and consequently a content area displayed thereon, will have a larger apparent size for P1 802 than for P2 806. Modification of presentation of the content may account for both apparent sizes. For example, presentation of the content may be modified based on the average apparent size between users P1 802 and P2 806. Alternatively, one of the users may have a higher priority than the other. For example, P1 may be the primary user of display device 800, while P2 is a guest. Thus, P1 may have a higher priority than P2. As another example, P1 may be the parent of P2 and thus have priority over P2. The apparent size of display device 800 to user P1 802 may therefore be given more weight than that of P2 806, even though P2 806 is farther from display device 800. In some cases, the apparent size of display device 800 for the highest priority user may be the only apparent size considered in modifying presentation of the content.

Figure 9:
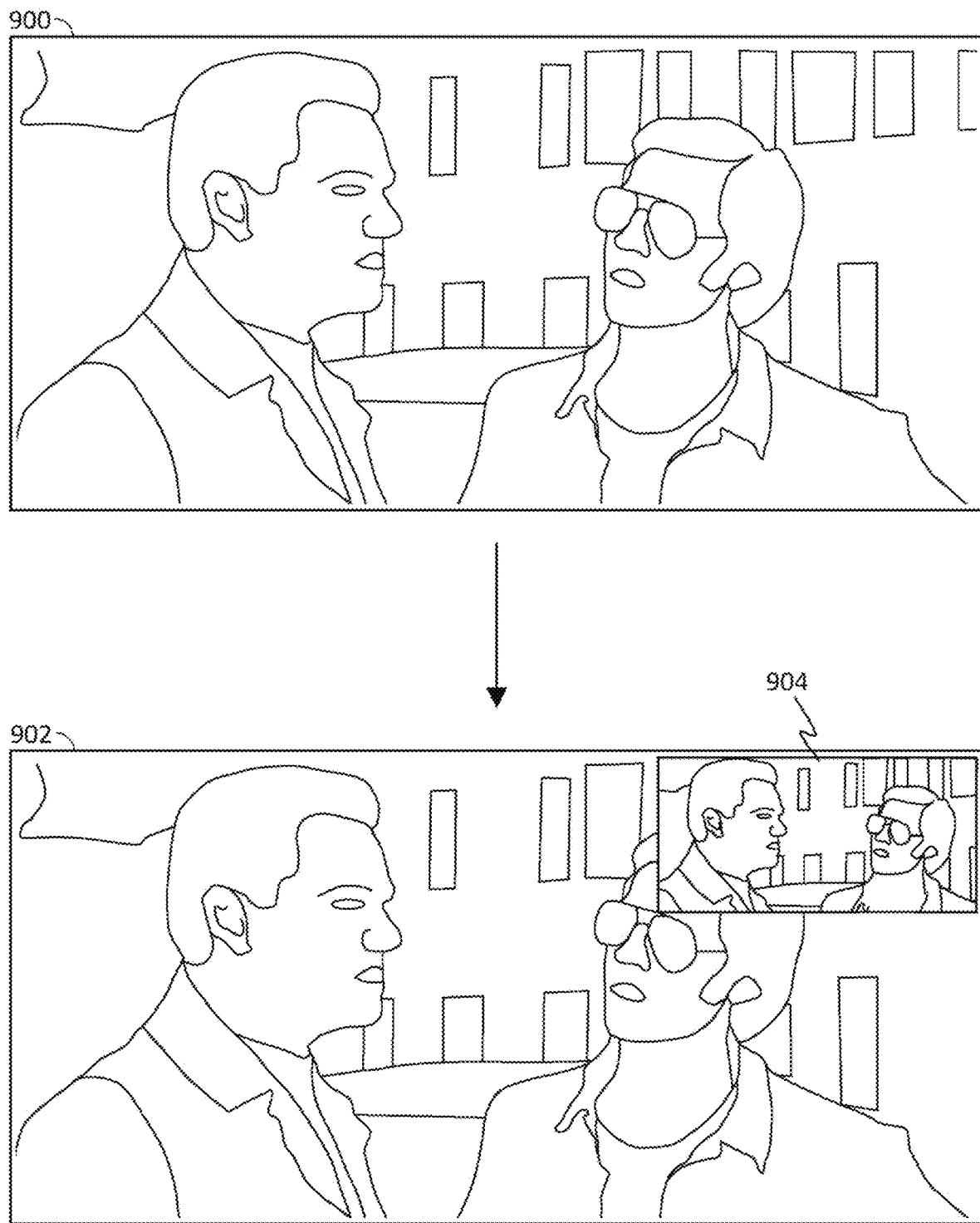
FIG. 9 shows modification of presentation of content by displaying a PIP window which displays the content at an increased zoom level, according to some embodiments of the disclosure.
Figure 10:
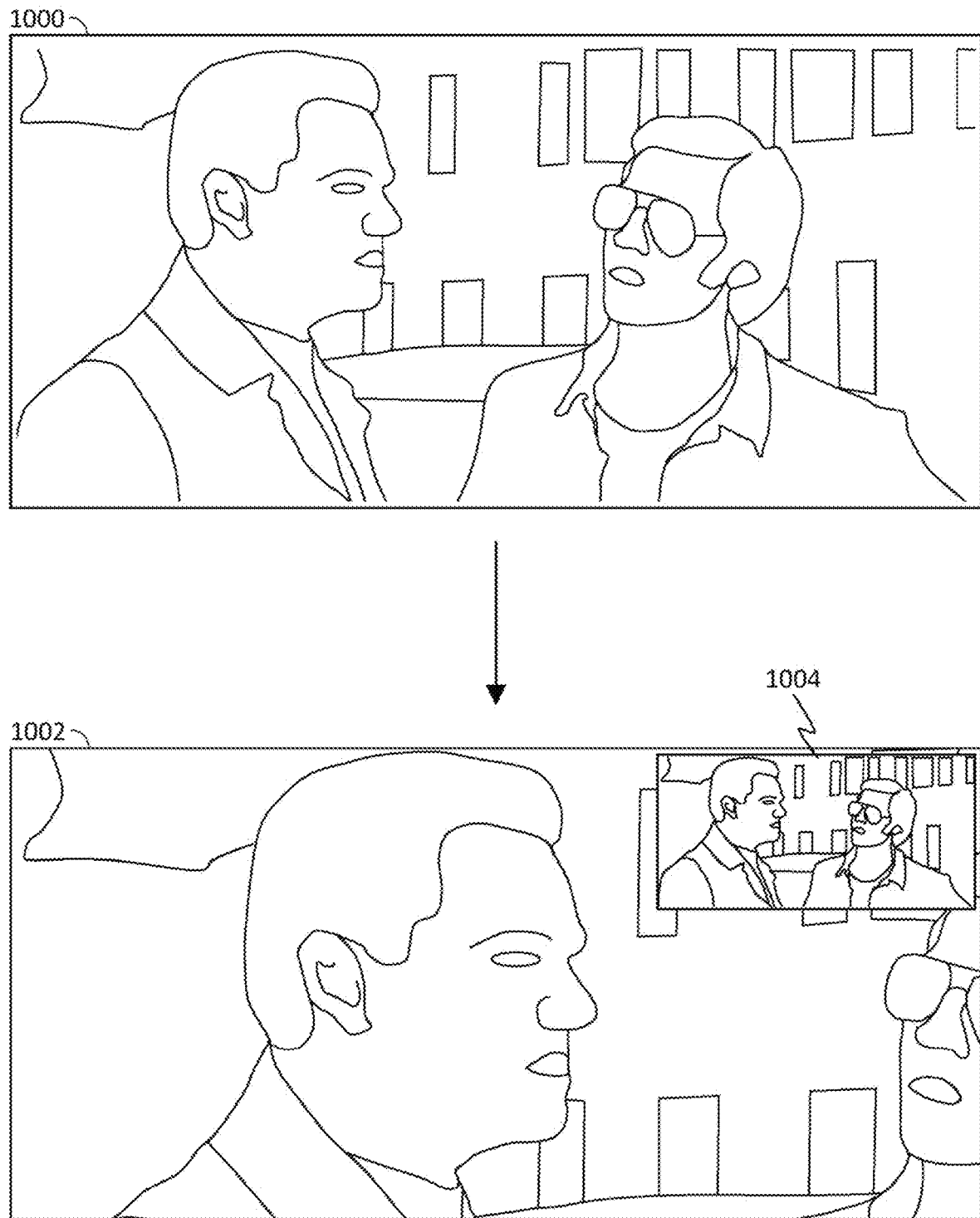
FIG. 10 shows modification of presentation of content by displaying a PIP window which displays the content at a default zoom level while a main content area displays the content at an increased zoom level, according to some embodiments of the disclosure.

Another example of modifying presentation of content for more than one user watching simultaneously on the same display device is use of a PIP window. FIG. 9 shows content area 900 displaying content as normal. If the apparent size of content area 900 is below a threshold size or below a threshold percentage of the actual size of content area 900 for one of a plurality of users watching the content, then a PIP window 904 may be generated for display. The combined display is presented in content area 902 which continues to display the content without modification while the PIP window 904 displays the content with a zoom factor applied. FIG. 10 shows content area 1000 displaying content as normal and, in response to the apparent size of the content area falling below the threshold, presentation of the content is modified in content area 1002, in which a zoom factor is applied to the content while PIP window 1004 is generated for display and presents the content without modification.

Figure 11:
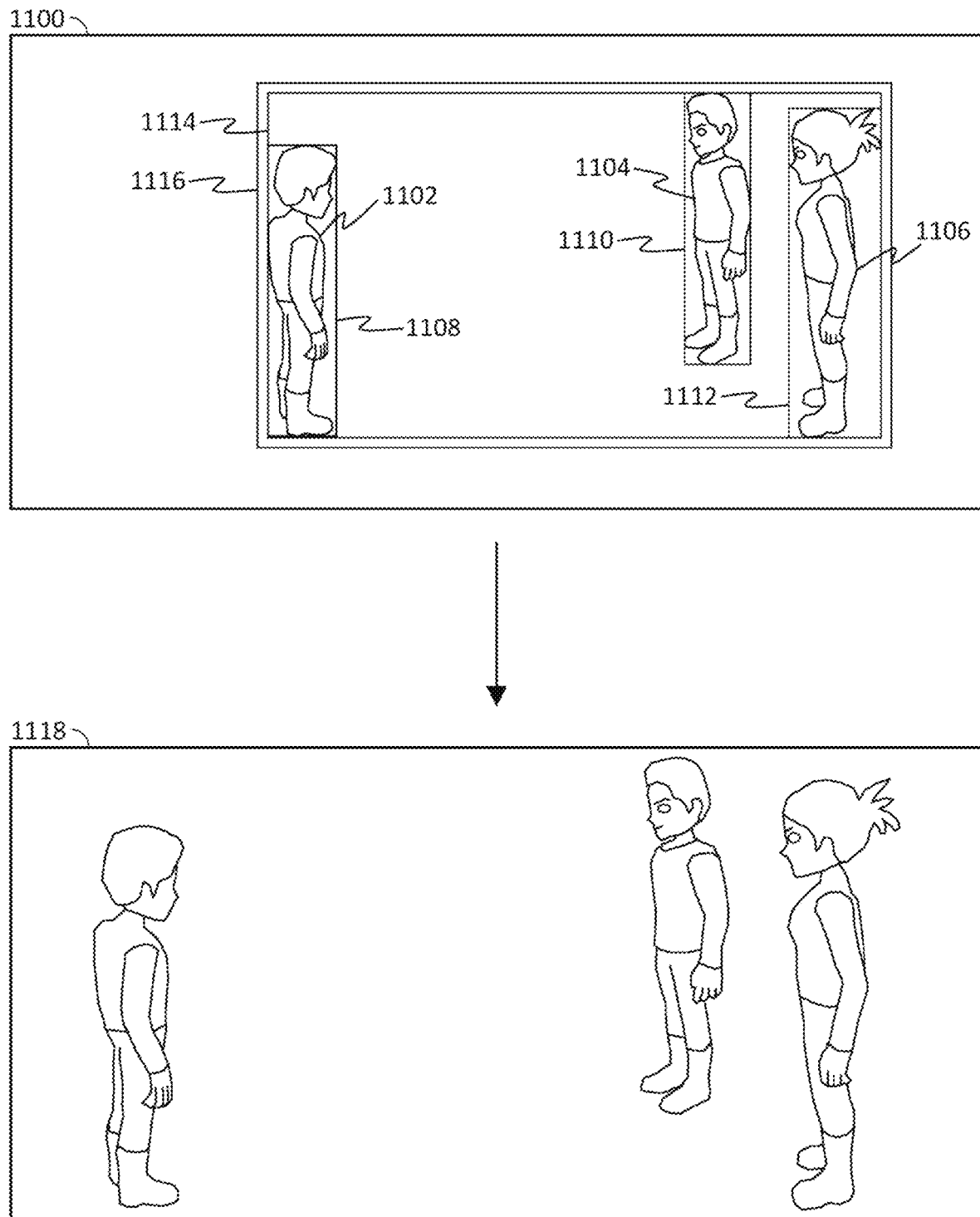
FIG. 11 shows detection of multiple entities displayed in the content and modification of presentation of content by setting the zoom level of the content in the content area to a level at which the detected entities are displayed, according to some embodiments of the disclosure.

If more than one entity depicted in the content is the current focus of the content, the zoom factor may be calculated so that as many of those entities as possible fit within the content area. The content may also be panned to center the entities in the content area. FIG. 11 shows detection of multiple entities displayed in the content and modification of presentation of content by setting the zoom level of the content area to a level at which the detected entities are displayed. Content is displayed in content area 1100, and entities 1102, 1104, and 1106 are depicted therein. Using image processing techniques (e.g., edge detection, object recognition), a set of coordinates is determined identifying bounding boxes 1108, 1110, and 1112 corresponding to the position of each depicted entity. The smallest area 1114 containing entities 1102, 1104, and 1106 is determined. A small buffer zone is added to each side of area 1114, resulting in spatial portion 1116. A zoom factor is then calculated to fit spatial portion 1116 into the size of the content area. The actual size of spatial portion 1116 may be adjusted to maintain the original proportions or aspect ratio of the content so as not to distort the content. Spatial portion 1116 is then displayed in content area 1118.

Figure 12:
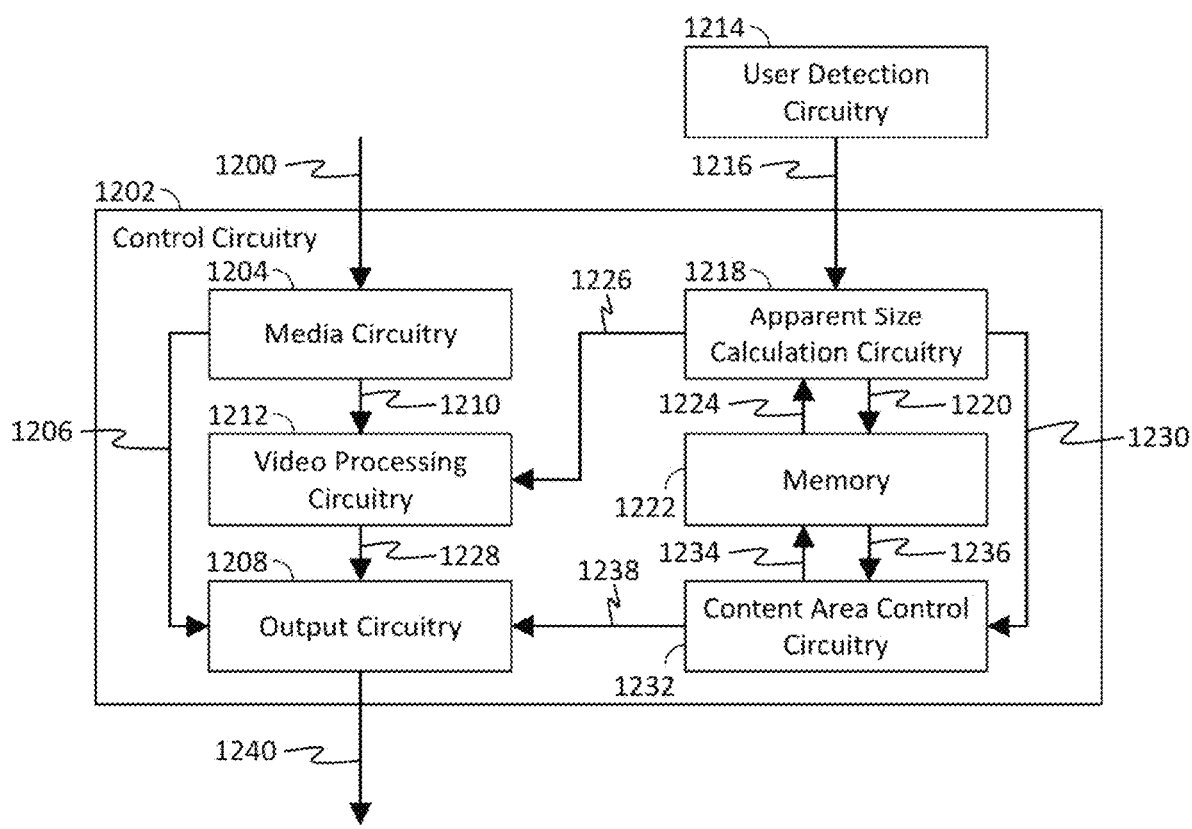
FIG. 12 is a block diagram representing components and data flow therebetween of a system, according to some embodiments of the disclosure.

FIG. 12 is a block diagram representing components and data flow therebetween of a system according to some embodiments of the disclosure. Media content is received 1200 from a content source by control circuitry 1202. Control circuitry 1202 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Media circuitry 1204 of control circuitry 1202 receives, decodes, and otherwise processes the media content for output. Audio data of the content is extracted from the media content and is transferred 1206 to output circuitry 1208 for output to an audio output device such as a speaker. Video data of the content is separately transmitted 1210 to video processing circuitry 1212. Video processing circuitry 1212 may include any suitable video decoding and encoding circuitry, as well as image processing and editing circuitry to affect modification of presentation of video content.

User detection circuitry 1214 detects users viewing the media content. User detection circuitry may include a camera, one or more infrared sensors, one or more ultraviolet sensors, or any other suitable sensors. User detection circuitry 1214 further determines a distance between the sensor and each user. For example, user detection circuitry 1214 may include an infrared emitter and an infrared receiver configured to determine the distance of an object based on the time required for an emitted pulse to be reflected back toward and detected by the receiver. Once the distance of each user has been determined, the distances are transmitted 1216 to apparent size calculation circuitry 1218. Apparent size calculation circuitry 1218 calculates the apparent size S of the content area for each user using the following formula:

$$S = 2\arctan\left(\frac{d}{2D}\right) \quad (1)$$

where d is the actual size of the content area and D is the distance to the user. Thus, the apparent size of the content area to a given user is a function of the distance of that user from the content area and the actual size of the content area. To determine the actual size of the content area, apparent size calculation circuitry 1218 transmits 1220 a request to memory 1222 to retrieve specifications of a display screen associated with the content area and the current size of the content area. Typically, this will be a pair of dimensions of the rectangular display, or the diagonal dimension across the screen, according to the 16:9 aspect ratio. Other ways of defining the actual size of the content area can be used, such as the area it occupies. Apparent size calculation circuitry 1218 receives 1224 the size information from memory 1222 and performs a calculation of apparent size for each user based on the received size information. If the apparent size of the content area to a user is below a threshold size, or below a threshold percentage of the actual size of the content area, then apparent size calculation circuitry 1218 transmits 1226 a signal to video processing circuitry 1212 to modify presentation of the content based on the apparent size of the content area. Video processing circuitry 1212 may modify presentation of the content by applying a zoom factor to the content or by selecting a spatial portion of the content for display, or both. Methods for modifying presentation of the content are described in detail below in connection with FIGS. 13-25.

Apparent size calculation circuitry 1218 may also transmit 1230 a signal to content area control circuitry 1232 to change the size of the content area. Content area control circuitry 1232 manages the size of the content area relative to the size of the entire display screen on which the content area is displayed. Content area control circuitry 1232 may, in response to receiving the signal from apparent size calculation circuitry 1218, modify the size and/or position of the content area within the display screen on which it is displayed. Content area control circuitry 1232 may transmit a request 1234 to memory 1222 to retrieve specification of the display screen associated with the content area. Content area control circuitry 1232 receives 1236 the specification from memory 1222 and compares the current size of the content area to the size of the display screen. If the current size of the content area is smaller than the size of the display screen, content area control circuitry 1232 may increase the size of the content area as needed until at least one dimension of the content area reaches the maximum corresponding dimension of the display screen.

Content area control circuitry 1232 transmits 1238 the size parameters of the content area to output circuitry 1208. Output circuitry 1208 combines the video of the content as processed by video processing circuitry 1212 with the content area parameters received from content area control circuitry 1232 and generates a video signal for output to the display screen. Output circuitry 1208 then outputs 1240 the audio of the content to an audio output device and the modified video of the content to a display screen.

Figure 13:
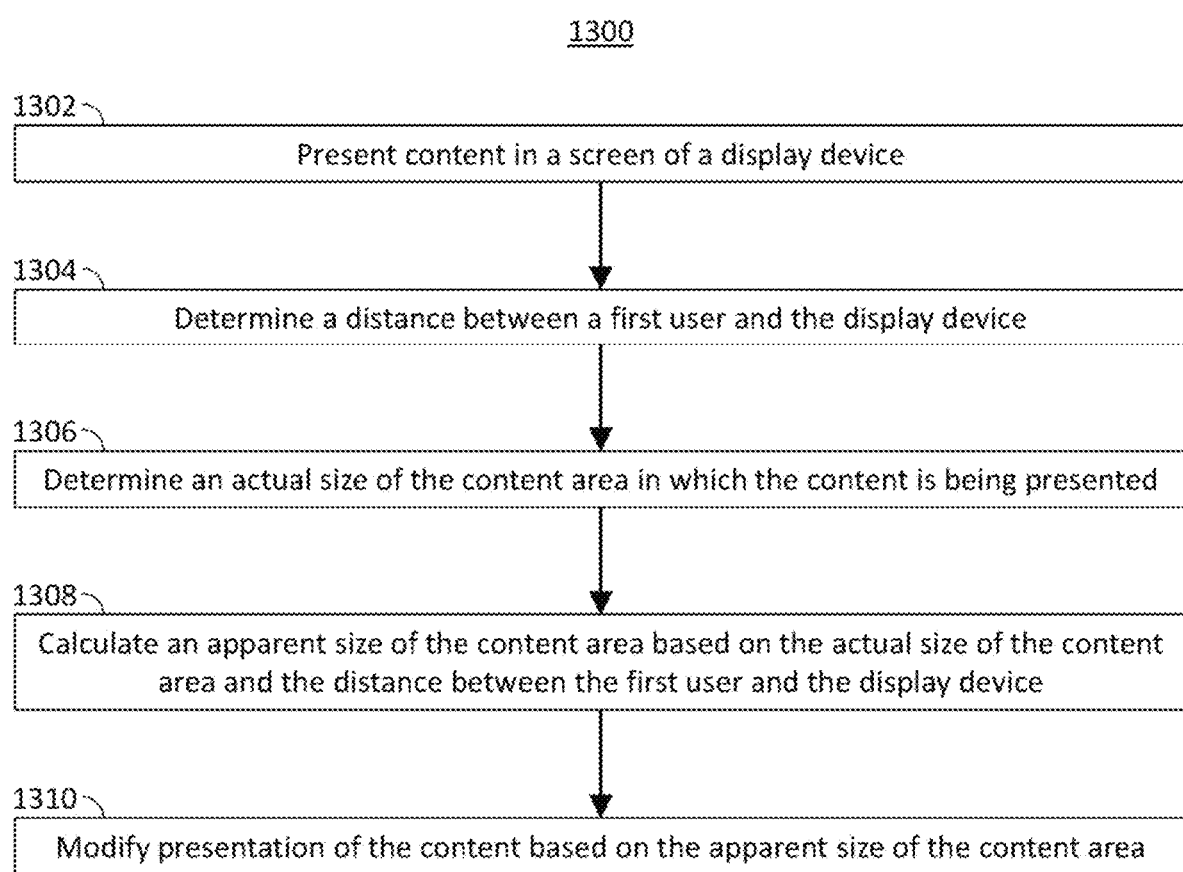
FIG. 13 is a flowchart representing a process for modifying presentation of content in a content area of a display device, according to some embodiments of the disclosure.

FIG. 13 is a flowchart representing an illustrative process 1300 for modifying presentation of content in a content area of a display device, according to some embodiments of the disclosure. Process 1300 may be implemented on control circuitry 1202. In addition, one or more actions of process 1300 may be incorporated into or combined with one or more actions of any other process or embodiment described herein.

At 1302, control circuitry 1202 presents content in a screen of a display device. Media content is received by control circuitry 1202 using media circuitry 1204. The media data is passed unaltered to output circuitry 1208 where it is generated for output to the user. Audio is output to a speaker or other audio device, and video is output to a display screen.

At 1304, control circuitry 1202 determines a distance between a first user and the display device. Control circuitry 1202 detects the first user using user detection circuitry 1214. User detection circuitry 1214 detects the presence of the first user and determines a distance between the first user and the display device using infrared sensors, ultraviolet sensors, cameras, or the like. At 1306, control circuitry 1202 determines an actual size of the content area in which the content is being presented on the display screen. The content area may not occupy the entire screen. Control circuitry 1202 retrieves, from memory 1222, specification of the display screen and current settings for the content area including the dimensions thereof. At 1308, control circuitry 1202, using the distance between the first user and the display device and the actual size of the content area, calculates an apparent size of the content area. Apparent size calculation circuitry 1218 may input the determined distance and actual size into Equation 1, above, to calculate the apparent size of the content area. At 1310, based on the apparent size of the content area, control circuitry 1202, using video processing circuitry 1212 and content area control circuitry 1232, modifies presentation of the content using methods described below.

The actions or descriptions of FIG. 13 may be used with any other embodiment of this disclosure. In addition, the actions and descriptions described in relation to FIG. 13 may be done in any suitable alternative orders or in parallel to further the purposes of this disclosure.

Figure 14:
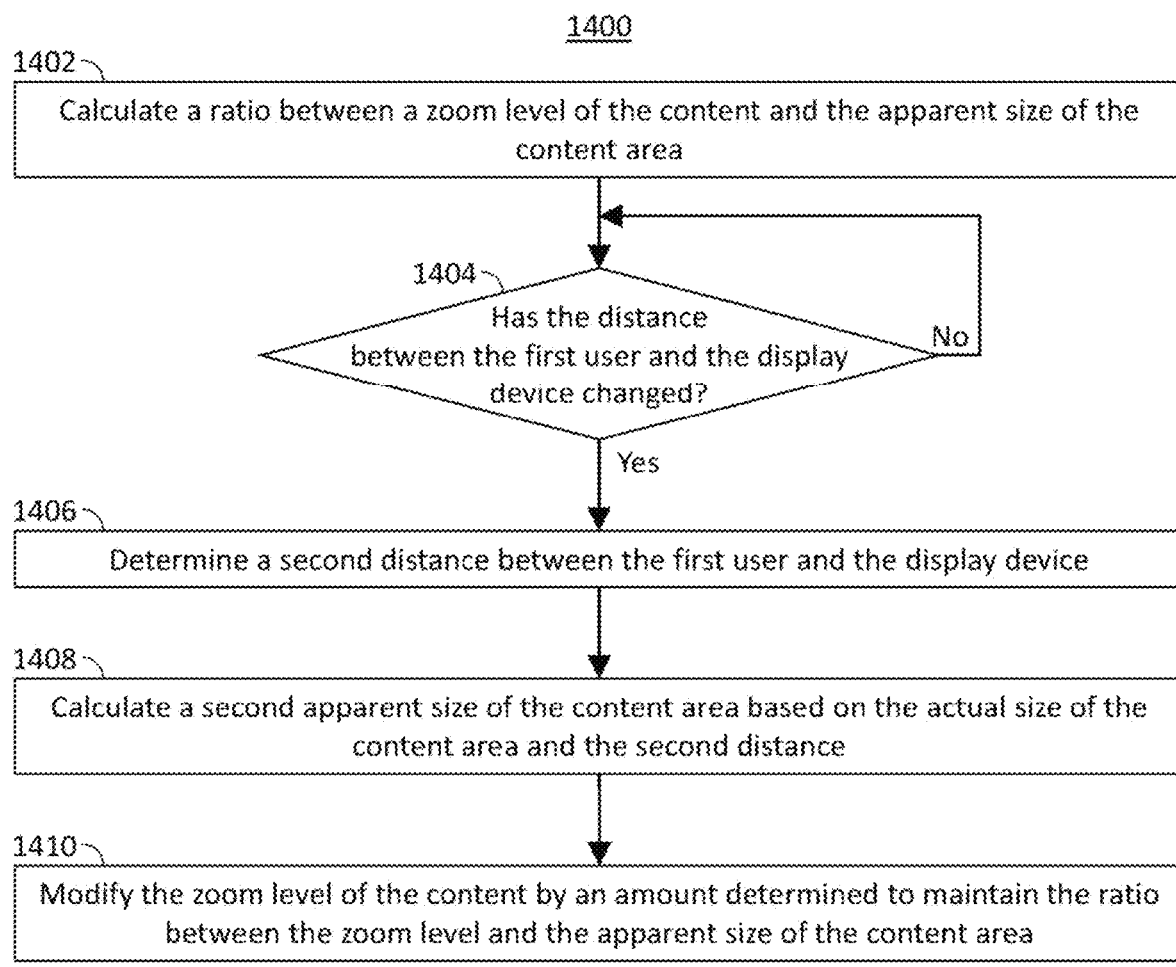
FIG. 14 is a flowchart representing a process for modifying a zoom level of content in a content area of a display device, according to some embodiments of the disclosure.

FIG. 14 is a flowchart representing an illustrative process 1400 for modifying a zoom level of content in a content area of a display device, according to some embodiments of the disclosure. Process 1400 may be implemented on control circuitry 1202. In addition, one or more actions of process 1400 may be incorporated into or combined with one or more actions of any other process or embodiment described herein.

At 1402, control circuitry 1202 calculates a ratio between a zoom level of the content area and the apparent size of the content area. For example, the content area may be the entirety of a 50-inch television screen. The content area may also have a default zoom level of 1. If the user is positioned at a distance of ten feet from the display screen, the content area would have an apparent size of approximately 0.41 radians. Thus, the ratio of zoom level to content area is 1:0.41. The zoom level is also inversely related, e.g., inversely proportional, to the apparent size of the content area. In this embodiment, control circuitry 1202 calculates a constant of proportionality based on this ratio using the following formula:

$$K = z \times a \qquad (2)$$

where z is the zoom level and a is the apparent size of the content area. In this example, the constant of proportionality K has a value of 0.41. At 1404, control circuitry 1202 determines whether the distance between the first user and the display screen has changed. For example, control circuitry 1202 may receive a signal from user detection circuitry 1214 indicating that the user has moved. If so, then, at 1406, control circuitry 1202 determines a second distance between the first user and the display device and, at 1408, calculates a second apparent size of the content area based on the actual size of the content area and the second distance. At 1410, control circuitry 1202 modifies the zoom level of the content in the content area by an amount determined to maintain the ratio between the zoom level and the apparent size of the content area. Control circuitry 1410 uses the constant of proportionality K to determine a zoom level at which the apparent size of the content displayed in the content area will remain the same. For example, if the first user moves farther from the display screen from ten feet to twelve feet, the apparent size of the content area at this distance would be approximately 0.34 radians. The zoom level required to maintain the previous apparent size of 0.41 radians can be calculated using the following rearrangement of Equation 2, above:

$$z = \frac{K}{a} \qquad (3)$$

Using the previously calculated constant of proportionality K of 0.41 and the new apparent size of the content area a of 0.34, control circuitry 1202 calculates a zoom level z of 1.2 is needed to maintain the apparent size of the content displayed in the content area.

The actions or descriptions of FIG. 14 may be used with any other embodiment of this disclosure. In addition, the actions and descriptions described in relation to FIG. 14 may be done in any suitable alternative orders or in parallel to further the purposes of this disclosure.

Figure 15:
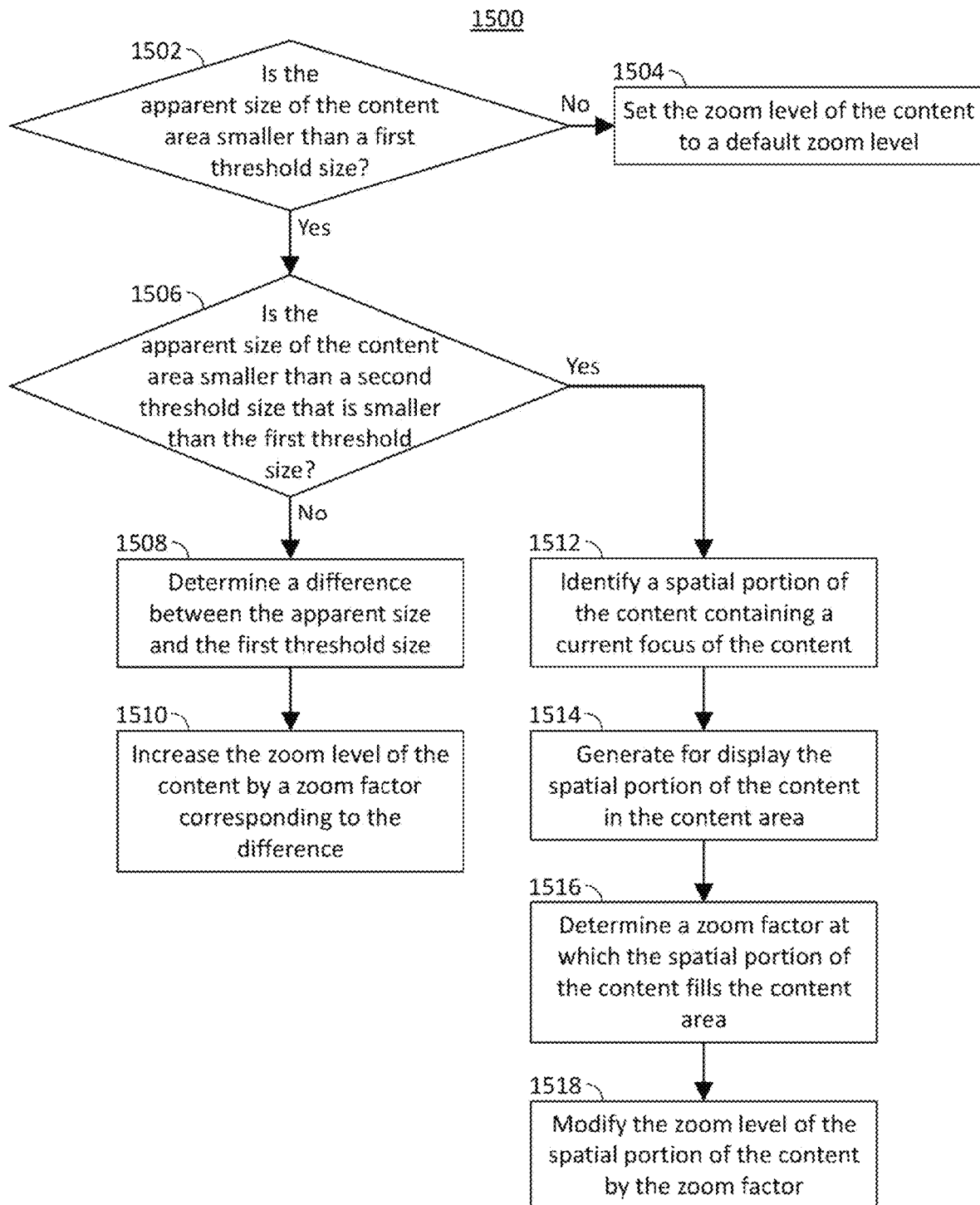
FIG. 15 is a flowchart representing a second process for modifying a zoom level of content in a screen portion of a display device, according to some embodiments of the disclosure.

FIG. 15 is a flowchart representing a second illustrative process 1500 for modifying a zoom level of content in a screen portion of a display device, according to some embodiments of the disclosure. Process 1500 may be implemented on control circuitry 1202. In addition, one or more actions of process 1500 may be incorporated into or combined with one or more actions of any other process or embodiment described herein.

At 1502, control circuitry 1202 determines whether the apparent size of the content area is smaller than a first threshold size. Small changes in distance between the first user and the display screen may not warrant a modification to the presentation of the content. The apparent size of the content is therefore compared with a threshold size. For example, the threshold size may be 0.4 radians. If the content area is the entirety of a 50-inch television screen and the user is positioned eight feet from the television screen, the apparent size of the television screen would be approximately 0.51 radians, which is above the threshold. If the user moves to a distance of ten feet, the apparent size of the television screen would be approximately 0.41 radians, which is above the threshold size. If the current apparent size of the content area is at or above the threshold size ("No" at 1502), then, at 1504, control circuitry 1202 sets the zoom level of the content in the content area to a default zoom level, such as a zoom level of 1. If the user moves even farther from the television screen, such as to a distance of ten and a half feet, then the apparent size of the television screen would be approximately 0.39 radians, which falls below the threshold size. If this happens, then, at 1506, control circuitry 1202 compares the apparent size of the content area to a second threshold size, such as 0.25 radians, which is smaller than the first threshold size. If the apparent size is at or above the second threshold size ("No" at 1506), as in this example, then, at 1508, control circuitry 1202 determines a difference between the apparent size of the first threshold size and, at 1510, increases the zoom level of the in the content content area by a zoom factor corresponding to the difference in size. In this example, the difference between the first threshold size and the apparent size is 0.01 radians. Control circuitry 1202 may calculate a zoom factor that increases the apparent size of the content area by the same amount.

If the apparent size is smaller than the second threshold size ("Yes" at 1506), then, at 1512, control circuitry 1202 identifies a spatial portion of the content containing a current focus of the content. This may be accomplished used methods described below in connections with FIGS. 16 and 17. At 1514, control circuitry 1202 generates for display the spatial portion of the content in the content area. For example, control circuitry 1202, using video processing circuitry 1212, may crop each frame of video to contain only the identified spatial portion. At 1516, control circuitry 1202 determines a zoom factor at which the spatial portion of the content fills the content area. This may be accomplished in a similar manner to that in which the zoom level is calculated above in connection with FIG. 14. For example, the constant of proportionality may be calculated based on the actual size of the content area and the actual size of the spatial portion. This constant is then used to determine a zoom level at which the spatial portion fills the content area. At 1518, control circuitry 1202 modifies the zoom level of the content in the content area by the determined zoom factor.

The actions or descriptions of FIG. 15 may be used with any other embodiment of this disclosure. In addition, the actions and descriptions described in relation to FIG. 15 may be done in any suitable alternative orders or in parallel to further the purposes of this disclosure.

Figure 16:
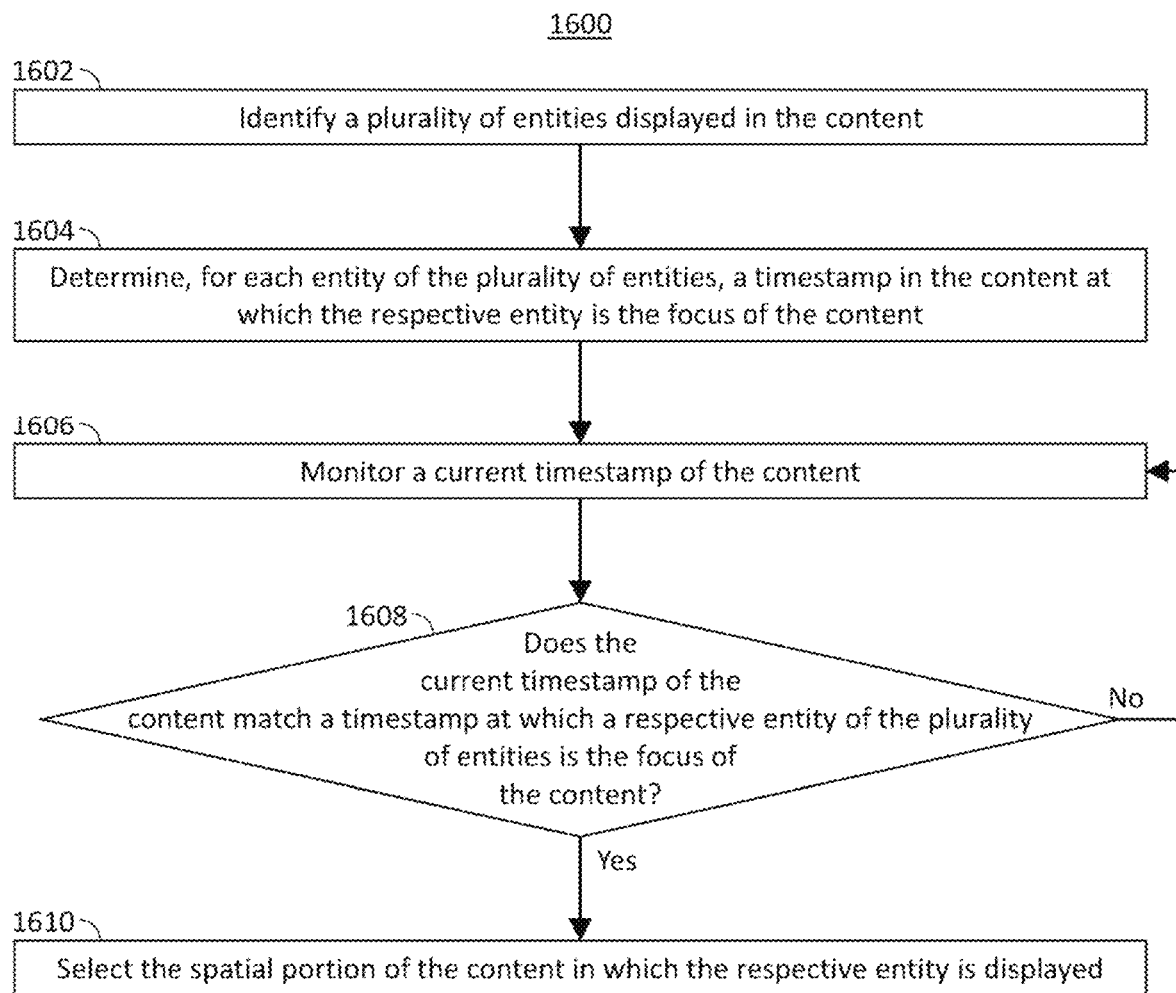
FIG. 16 is a flowchart representing a process for determining a spatial portion of content in which an entity that is the current focus of the content is displayed, according to some embodiments of the disclosure.

FIG. 16 is a flowchart representing an illustrative process 1600 for determining a spatial portion of content in which an entity that is the current focus of the content is displayed, according to some embodiments of the disclosure. Process 1600 may be implemented on control circuitry 1202. In addition, one or more actions of process 1600 may be incorporated into or combined with one or more actions of any other process or embodiment described herein.

At 1602, control circuitry 1202 identifies a plurality of entities displayed in the content. For example, control circuitry 1202, using video processing circuitry 1212, performs edge detection, object recognition, facial recognition or any other image processing technique to identify entities displayed in the content. At 1604, control circuitry 1202 determines, for each entity of the plurality of entities, a timestamp in the content at which the respective entity is the focus of the content. For example, control circuitry 1202 may access metadata of the content item that describes each entity in the content and includes timestamps at which each entity is the focus of the content.

At 1606, control circuitry 1202 monitors a current timestamp of the content. For example, control circuitry 1202 may keep a running counter from the start of the content item. Alternatively, the content item may contain timestamps that can be accessed and/or read by control circuitry 1202. At 1608, control circuitry 1202 determines whether the current timestamp of the content matches a timestamp at which a s respective entity of the plurality of entities is the focus of the content. For example, control circuitry 1202 may compare the current timestamp to the timestamps determined above. If the current timestamp matches a timestamp at which an entity is the focus of the content, then, at 1610, control circuitry 1202 selects the spatial portion of the content in which the respective entity is displayed. For example, control circuitry 1202 may perform object recognition or facial recognition to determine the spatial portion of the content in which the entity is displayed. Alternatively, the metadata of the content may include coordinates and/or motion vectors for each entity within the content along with the timestamp information. Control circuitry 1202 may access the metadata to determine the coordinates of the entity and select a spatial portion which includes, at a minimum, the coordinates of the entity.

The actions or descriptions of FIG. 16 may be used with any other embodiment of this disclosure. In addition, the actions and descriptions described in relation to FIG. 16 may be done in any suitable alternative orders or in parallel to further the purposes of this disclosure.

Figure 17:
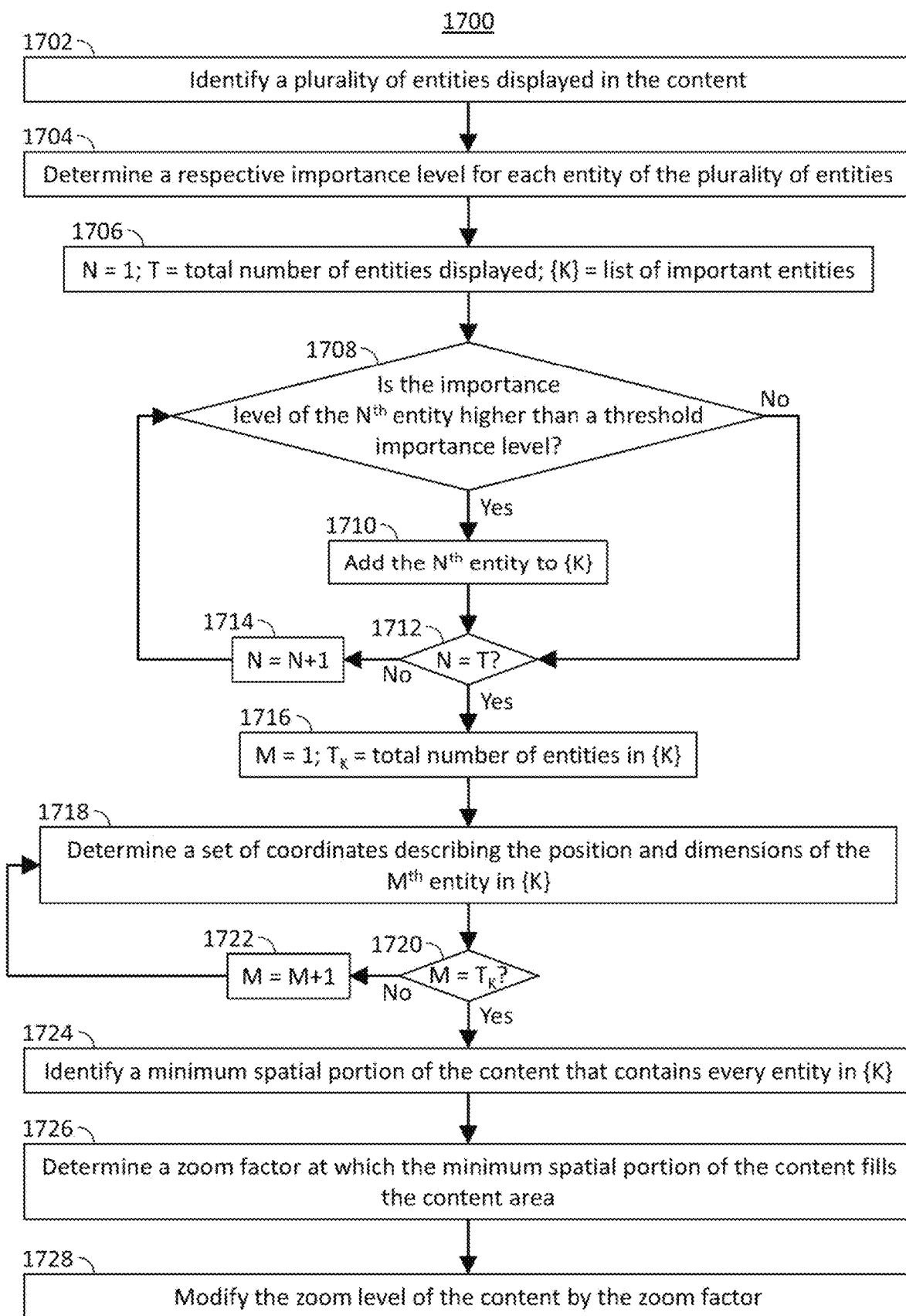
FIG. 17 is a flowchart representing a process for modifying a zoom level of content in a content area to fit a plurality of entities displayed in the content, according to some embodiments of the disclosure.

FIG. 17 is a flowchart representing an illustrative process 1700 for modifying a zoom level of content in a content area to fit a plurality of entities displayed in the content, according to some embodiments of the disclosure. Process 1700 may be implemented on control circuitry 1202. In addition, one or more actions of process 1700 may be incorporated into or combined with one or more actions of any other process or embodiment described herein.

At 1702, control circuitry 1202 identifies a plurality of entities displayed in the content. This may be accomplished using methods described above in connection with FIG. 16. At 1704, control circuitry 1202 determines a respective importance level for each entity of the plurality of entities. For example, control circuitry 1202 may determine whether the entity is displayed in the background or foreground of the content. Entities in the foreground may have a higher importance than entities in the background. Additionally or alternatively, control circuitry 1202 may determine whether the entity is in or out of focus by, for example, using edge detection techniques to determine the sharpness of the edges of the entity. Entities in focus may have a higher importance than entities that are out of focus. Entity size, color variations, level of detail, and entity movement may also be considered in determining the importance of each entity. Control circuitry 1202 may also access metadata of the content describing the importance of each entity at a given timestamp within the content, or describing a storyline of the content which includes a mention of a particular entity. Another method of determining the importance of entities is through the user of audio recognition. If an entity does not make any sound, then it is likely to be of low importance, whereas an entity that makes audible sounds is likely to be of at least some importance. This importance level would be increased if the same entity makes sounds in more than one portion of the content.

At 1706, control circuitry 1202 initializes a counter variable N, setting its value to one, a variable T representing the total number of entities currently displayed in the content, and a list, array, or other data structure {K} to hold a list of important entities. At 1708, control circuitry 1202 determines whether the importance level of the $N^{th}$ entity is higher than a threshold importance level. For example, each entity may have an importance level between one and ten, and the threshold importance level may be seven. If an entity has an importance level that is higher a than the threshold importance level ("Yes" at 1708), then, at 1710, control circuitry 1202 adds the $N^{th}$ entity to {K}. After adding the $N^{th}$ entity to {K}, or if the importance level of the $N^{th}$ entity is not higher than the threshold importance level, at 1712, control circuitry 1202 determines whether N is equal to T, meaning that all entities currently displayed have been processed. If N is not equal to T ("No" at 1712), then, at 1714, control circuitry increments the value of N by one, and processing returns to step 1708.

If N is equal to T ("Yes" at 1712), then, at 1716, control circuitry 1202 initializes a second counter variable M, settings its value to 1, and a variable $T_K$, representing the number of entities in {K}. At 1718, control circuitry 1202 determines a set of coordinates describing the position, width, and height of the $M^{th}$ entity in {K}. For example, control circuitry 1202 may use object recognition, facial recognition, edge detection, or other image processing techniques to identify a topmost, bottommost, leftmost, and rightmost pixel of the $M^{th}$ entity. By taking the smallest vertical coordinate of any pixel and the smallest horizontal coordinate of any pixel, control circuitry 1202 can identify the top-left corner of a box surrounding the $M^{th}$ entity. The largest vertical and horizontal coordinates taken together can be used to identify a bottom-right corner of the box, the smallest horizontal coordinate together with the largest vertical coordinate can identify the bottom-left corner of the box, and the smallest vertical coordinate together with the largest horizontal coordinate can identify the top-right corner of the box. At 1720, control circuitry 1202 determines whether M is equal to $T_K$, meaning that coordinates have been determined for all entities in {K}. If M is not equal to $T_K$ ("No" at 1720), then, at 1722, control circuitry 1202 increments the value of M by one, and processing returns to step 1718.

If M does equal $T_K$ ("Yes" at 1720), then, at 1724, control circuitry 1202 identifies a minimum spatial portion of the content that contains every entity in {K}. For example, control circuitry may use the most extreme horizontal and vertical coordinates of each entity in {K} to define a spatial portion which includes all the entities in {K}. To ensure than none of the entities is partially cut out of the spatial portion, a buffer area may be added to the spatial portion in each direction. At 1726, control circuitry 1202 determines a zoom factor at which the minimum spatial portion of the content fills the content area. For example, control circuitry 1202 may calculate a zoom factor that increases the size of the spatial portion to match the size of the content area. If the spatial portion does not have the same aspect ratio as the content area, a zoom factor may be calculated so that the largest dimension of the spatial portion fills the corresponding dimension of the content area. At 1728, control circuitry 1202 modifies the zoom level of the content in the content area by the determined zoom factor.

The actions or descriptions of FIG. 17 may be used with any other embodiment of this disclosure. In addition, the actions and descriptions described in relation to FIG. 17 may be done in any suitable alternative orders or in parallel to further the purposes of this disclosure.

Figure 18:
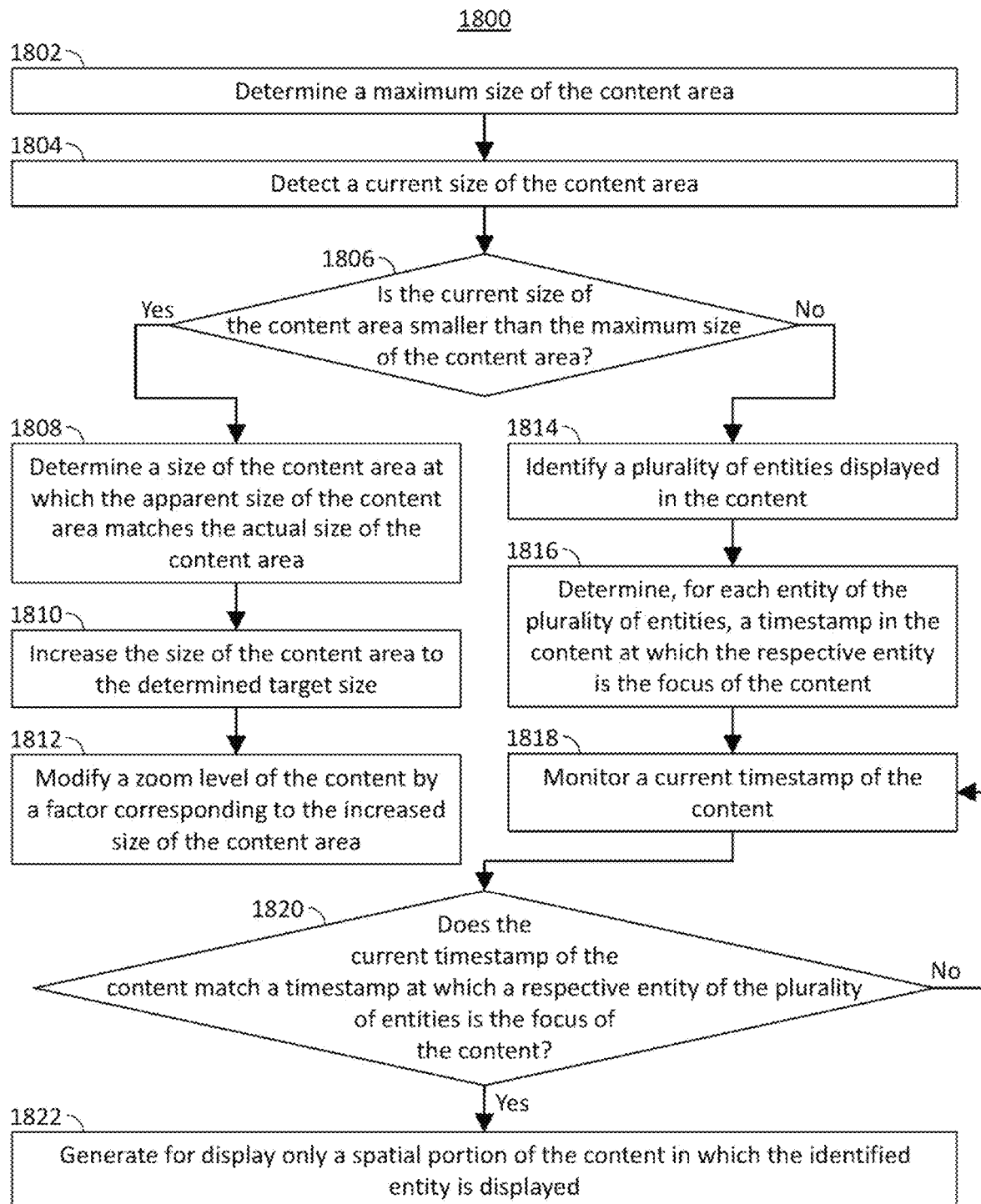
FIG. 18 is a flowchart representing a process for modifying presentation of content in a content area of a display device based on the current size of the content area and the maximum size of the content area, according to some embodiments of the disclosure.

FIG. 18 is a flowchart representing an illustrative process 1800 for modifying presentation of content in a content area of a display device based on the current size of the content area and the maximum size of the content area, according to some embodiments of the disclosure. Process 1800 may be implemented on control circuitry 1202. In addition, one or more actions of process 1800 may be incorporated into or combined with one or more actions of any other process or embodiment described herein.

At 1802, control circuitry 1202 determines a maximum size of the content area. For example, control circuitry 1202 retrieves, from memory 1222, specifications of the display screen in which the content area is displayed. Control circuitry 1202 may also retrieve information regarding other on-screen elements that are set to remain visible at all times. From the retrieved information, control circuitry 1202 may determine what portion, whether all or less than all, of the display screen can be occupied by the content area. At 1804, control circuitry 1202 detects the current size of the content area. For example, control circuitry 1202 may retrieve, from memory 1222, settings for a video application through which the content window is currently being generated. Control circuitry 1202 may, alternatively or additionally, request size information from content area control circuitry 1232. At 1806, control circuitry 1202 determines whether the current size of the content area is smaller than the maximum size of the content area by, for example, subtracting the current size from the maximum size. If the difference between the maximum size and the current size is greater than zero, then the current size of the content area is smaller than the maximum size of the content area.

If the current size is smaller than the maximum size ("Yes" at 1806), then, at 1808, control circuitry 1202 determines a size of the content area at which the apparent size of the content area matches the current actual size of the content area. For example, control circuitry 1202 may determine a current actual size of the content area in radians by calculating a theoretical apparent size from an optimal viewing distance. Control circuitry 1202 may then calculate a new size of the content area at which the apparent size of the content area at the user's current distance matches the apparent size of the content area at the optimal viewing distance. If the current size of the content area occupies a portion of a television screen having the same aspect ratio as the television screen and a diagonal of 50 inches, and the optimal viewing distance is 10 feet, then the apparent size at the optimal viewing distance is 0.41 radians. By manipulating Equation 1, above, a size at which the content area will have the same apparent size at a different distance can be determined, as follows:

$$2 \arctan\left(\frac{d_{target}}{2D}\right) = a_{optimal} \quad (4)$$

$$\arctan\left(\frac{d_{target}}{2D}\right) = \frac{a_{optimal}}{2} \quad (5)$$

$$\frac{d_{target}}{2D} = \tan\left(\frac{a_{optimal}}{2}\right) \quad (6)$$

$$d_{target} = 2D \tan\left(\frac{a_{optimal}}{2}\right) \quad (7)$$

where $d_{target}$ is the target size at which the apparent size will equal the actual size at the optimal viewing distance ($a_{optimal}$), and D is the current distance of the user from the display screen. Thus, if the user is currently twelve feet from the display screen, the content area would have to have a diagonal dimension of approximately 60 inches to maintain an apparent size of 0.41 radians. At 1810, control circuitry 1202, using content area control circuitry 1232, increases the size of the content area to the determined target size. At 1812, control circuitry 1202 modifies the zoom level of the content in the content area by a factor corresponding to the increased size of the content area. This may be accomplished using methods described above in connection with FIG. 17.

If the current size of the content area is already at the maximum size of the content area ("No" at 1806), then, at 1814, control circuitry 1202 identifies a plurality of entities displayed in the content and, and 1816, determines, for each entity of the plurality of entities, a timestamp in the content at which the respective entity is the focus of the content. Control circuitry 1202 then, at 1818, monitors a current timestamp of the content and, if it is determined, at 1820, that the current timestamp of the content matches a timestamp at which an entity is the focus of the content, then, at 1822, control circuitry 1202 generates for display a spatial portion of the content in which the identified entity is displayed. This may be accomplished using methods described above in connection with FIG. 16.

The actions or descriptions of FIG. 18 may be used with any other embodiment of this disclosure. In addition, the actions and descriptions described in relation to FIG. 18 may be done in any suitable alternative orders or in parallel to further the purposes of this disclosure.

Figure 19:
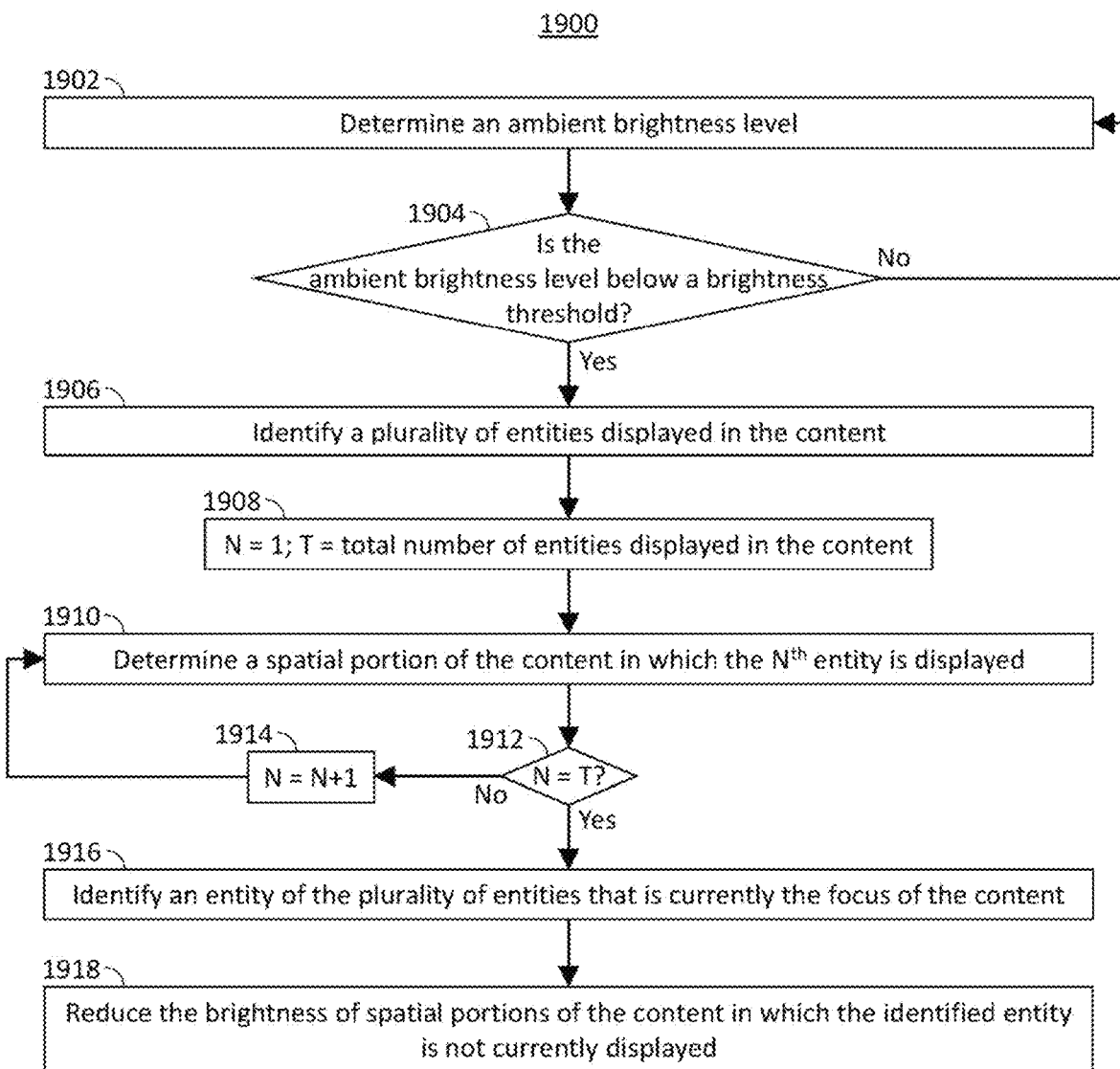
FIG. 19 is a flowchart representing a process for modifying presentation of content in a content area of a display device based on ambient brightness, according to some embodiments of the disclosure.

FIG. 19 is a flowchart representing an illustrative process 1900 for modifying presentation of content in a content area of a display device based on ambient brightness, according to some embodiments of the disclosure. Process 1900 may be implemented on control circuitry 1202. In addition, one or more actions of process 1900 may be incorporated into or combined with one or more actions of any other process or embodiment described herein.

At 1902, control circuitry 1202 determines an ambient brightness level. For example, control circuitry may include, or communicate with, a photosensor or other component that generates a variable signal based on the amount of light received by the component. At 1904, control circuitry 1202 determines whether the ambient brightness level is below a brightness threshold, such as 50 lux. If the ambient brightness is below the brightness threshold, then at 1906, control circuitry 1202 identifies a plurality of entities displayed in the content. This may be accomplished using methods described above in connection with FIG. 16.

At 1908, control circuitry 1202 initializes a counter variable N, setting its value to one, and a variable T, representing the number of entities displayed in the content. At 1910, control circuitry 1202 determines a spatial portion of the content in which the $N^{th}$ entity is displayed. For example, control circuitry 1202 may use edge detection to generate a path that encompasses the $N^{th}$ entity. At 1912, control circuitry 1202 determines whether N is equal to T, meaning that all entities displayed in the content have been processed. If N is not equal to T ("No" at 1912), then, at 1914, control circuitry 1202 increments the value of N by one, and processing returns to step 1910. If N is equal to T ("Yes" at 1912), then, at 1916, control circuitry 1202 identifies an entity of the plurality of entities that is currently the focus of the content. This may be accomplished using methods described above in connection with FIG. 16. At 1918, control circuitry 1202 reduces the brightness of spatial portions of the content in which the identified entity is not currently displayed. For example, control circuitry 1202 may, using video processing circuitry 1212, alter the brightness data for each pixel of the content that does not fall within an area bounded by the path representing the entity that is the current focus of the content.

The actions or descriptions of FIG. 19 may be used with any other embodiment of this disclosure. In addition, the actions and descriptions described in relation to FIG. 19 may be done in any suitable alternative orders or in parallel to further the purposes of this disclosure.

Figure 20:
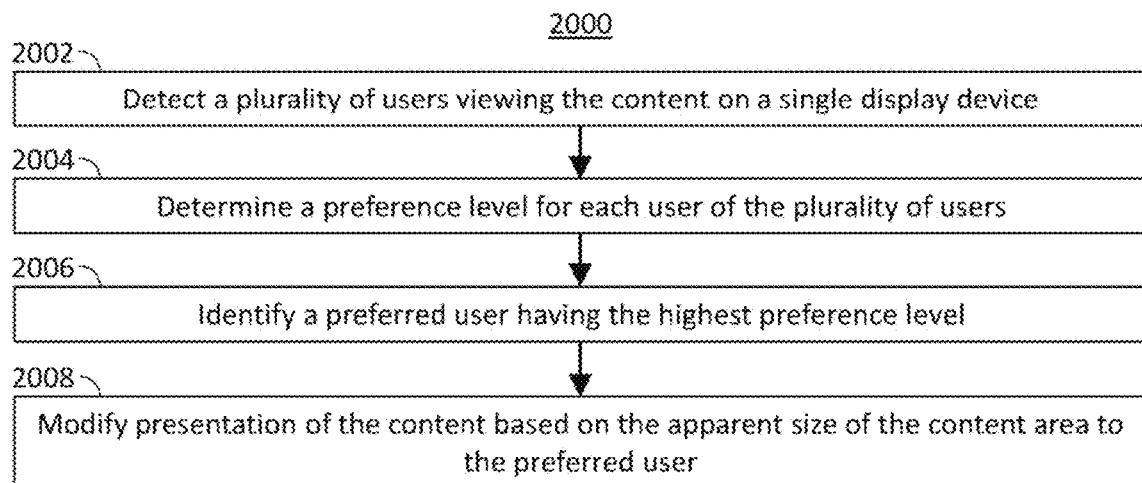
FIG. 20 is a flowchart representing a process for modifying presentation of content in a content area of a display device based on the apparent size of the content area to a preferred user, according to some embodiments of the disclosure.

FIG. 20 is a flowchart representing an illustrative process 2000 for modifying presentation of content in a content area of a display device based on the apparent size of the content area to a preferred user, according to some embodiments of the disclosure. Process 2000 may be implemented on control circuitry 1202. In addition, one or more actions of process 2000 may be incorporated into or combined with one or more actions of any other process or embodiment described herein.

At 2002, user detection circuitry 1214 detects a plurality of users viewing the content on a single display device. Control circuitry 1202 may, using methods described above in connection with FIG. 13, detect and determine the distances of more than one user at a time. At 2004, control circuitry 1202 determines a preference level for each user of the plurality of users. For example, control circuitry 1202 may identify each user through facial recognition or through devices associated with each user detected in the vicinity of the display device. Control circuitry 1202 may access a user database containing a plurality of entries, each associated with a different user and including a preference level for each known user. Control circuitry 1202 may retrieve entries for the identified users and determine a preference level for each user from the retrieved entries. At 2006, control circuitry 1202 identifies a preferred user having the highest preference level. For example, control circuitry 1202 may compare the preference level of each user with that of each other user to determine which user has the highest preference level. At 2008, control circuitry 1202 modifies presentation of the content based on the apparent size of the content area to the preferred user.

The actions or descriptions of FIG. 20 may be used with any other embodiment of this disclosure. In addition, the actions and descriptions described in relation to FIG. 20 may be done in any suitable alternative orders or in parallel to further the purposes of this disclosure.

Figure 21:
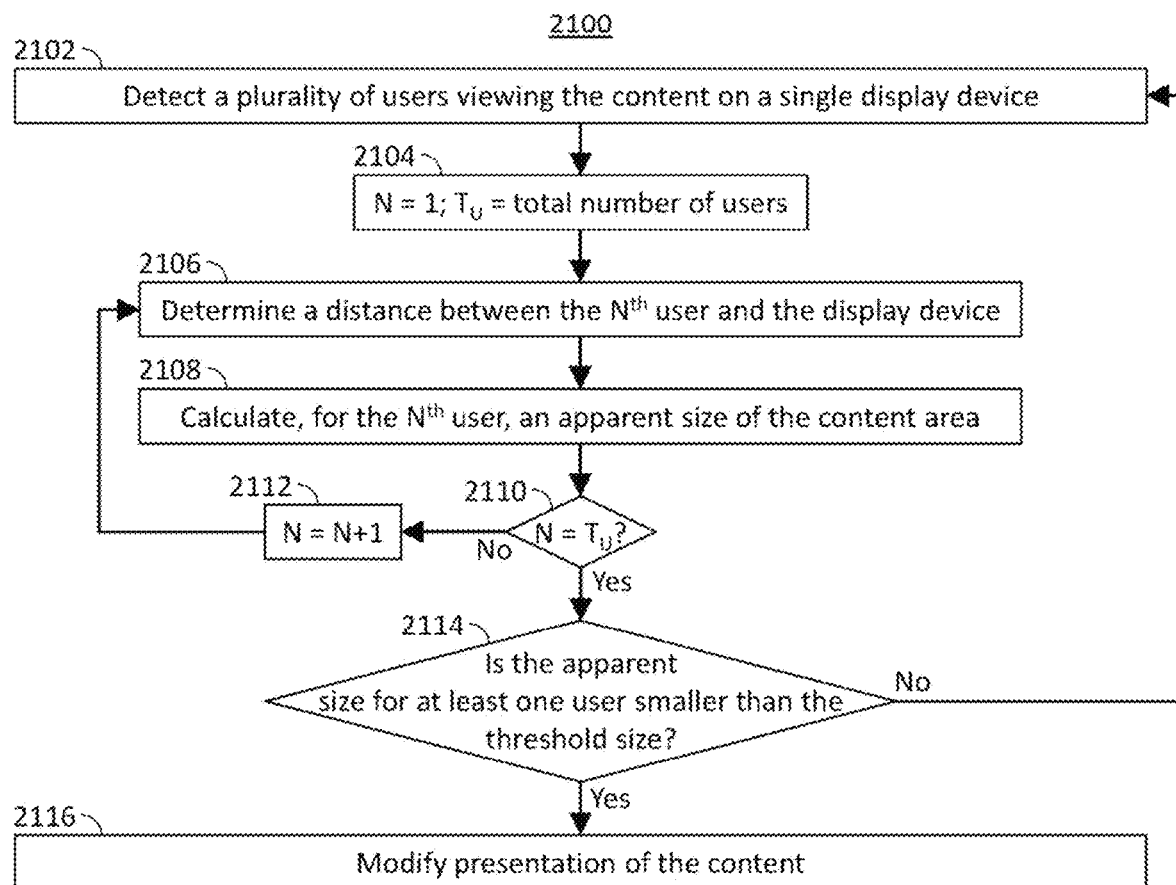
FIG. 21 is a flowchart representing a process for modifying presentation of content in a screen portion of a display device when multiple users are watching the display device, according to some embodiments of the disclosure.

FIG. 21 is a flowchart representing an illustrative process 2100 for modifying presentation of content in a screen portion of a display device when multiple users are watching the display device, according to some embodiments of the disclosure. Process 2100 may be implemented on control circuitry 1202. In addition, one or more actions of process 2100 may be incorporated into or combined with one or more actions of any other process or embodiment described herein.

At 2102, user detection circuitry 1214 detects a plurality of users viewing the content on a single display device, which may be accomplished using methods described above in connection with FIGS. 13 and 20. At 2104, control circuitry 1202 initializes a counter variable N, setting its value to one, and a variable $T_U$, representing the total number of users detected. At 2106, control circuitry 1202 determines a distance between the $N^{th}$ user and the display device and, at 2108, calculates, for the $N^{th}$ user, an apparent size of the content area. This may be accomplished using methods described above in connection with FIG. 13. At 2110, control circuitry 1202 determines whether N is equal to $T_U$, meaning an apparent size has been calculated for all detected users. If N is not equal to $T_U$ ("No" at 2110), then, at 2112, control circuitry 1202 increments the value of N by one, and processing returns to step 2106. If N is equal to $T_U$ ("Yes" at 2110), then, at 2114, control circuitry 1202 determines whether the apparent size for at least one user is smaller than the threshold size. This may be accomplished using methods described above in connection with FIG. 13. If the apparent size for at least one user is smaller than the threshold size, then, at 2116, control circuitry 1202 modifies presentation of the content. For example, control circuitry 1202 may determine the smallest respective apparent size of the content area among the respective apparent sizes for each detected user and modify a zoom level of the content in the content area based on the smallest apparent size. As another example, control circuitry 1202 may calculate an average apparent size of the content area based on the respective apparent sizes for all detected users and modify a zoom level of the content in the content area based on the average apparent size. In some embodiments, control circuitry 1202 may generate a PIP window and either display the modified version of the content in the PIP window while continuing to display the default version of the content in the main content area, or display the default version of the content in the PIP window and display the modified version of the content in the main content area.

The actions or descriptions of FIG. 21 may be used with any other embodiment of this disclosure. In addition, the actions and descriptions described in relation to FIG. 21 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   presenting for display content on a display device comprising a display area;
   detecting a plurality of users viewing the content on the display device;
   for each user of the plurality of users:
      determining a distance between the user and the display device; and
      calculating an apparent size of the display area to the user based on (1) the distance between the user and the display device and (2) an actual size of the display area, wherein the apparent size corresponds to a size that the user perceives the display area to be, and wherein the apparent size is represented by a portion of a spherical projection of a field of view of the user; and
   based at least in part on determining that the apparent size of the display area for at least one user of the plurality of users is smaller than a threshold display area size, modifying a presentation of the content in the display area based on the apparent size of the display for the at least one user.

2. The method of claim 1, further comprising:
   determining a preference level for each user of the plurality of users;
   identifying a preferred user having a highest determined preference level; and
   modifying the presentation of the content in the display area based on the apparent size of the display area to the preferred user.

3. The method of claim 2, wherein determining the preference level for each user of the plurality of users comprises, for each user:
   identifying the user of the plurality of users by using facial recognition or detecting a device associated with the user within a vicinity of the display device;
   accessing a user database comprising a plurality of entries, wherein each entry of the plurality of entries is associated with a different user of the plurality of users, and wherein each entry includes a preference level of a user corresponding to the entry; and
   retrieving an entry of the plurality of entries associated with the identified user.

4. The method of claim 2, wherein the preferred user is the at least one user of the plurality of users.

5. The method of claim 1, wherein the apparent size is further calculated based at least in part on an arc length relative to the spherical projection of the field of view of the user.

6. The method of claim 1, wherein modifying the presentation of the content in the display area comprises increasing the actual size of the content in the display area by modifying a zoom level of the content in the display area.

7. The method of claim 6, wherein an amount by which the zoom level is modified is inversely proportional to the apparent size of the content in the display area.

8. The method of claim 1, wherein modifying the presentation of the content in the display area comprises:
  identifying a spatial portion of the content in the display area containing a current focus of the content; and
  generating for display the spatial portion of the content in the display area.

9. The method of claim 8, wherein the current focus of the content item comprises one of a character, an actor, a location, or an audio source.

10. The method of claim 1, wherein modifying the presentation of the content in the display area comprises:
  determining an ambient brightness level of the content in the display area;
  comparing the ambient brightness level to a brightness threshold; and
  based at least in part on determining, based on the comparing, that the ambient brightness level is below the brightness threshold:
    increasing the ambient brightness level of the content in the display area.

11. A system comprising:
  a memory; and
  a control circuitry configured to:
    present for display content on a display device comprising a display area, wherein the content is stored in the memory;
    detect a plurality of users viewing the content on the display device;
    for each user of the plurality of users:
      determine a distance between the user and the display device; and
      calculate an apparent size of the display area to the user based on (1) the distance between the user and the display device and (2) an actual size of the display area, wherein the apparent size corresponds to a size that the user perceives the display area to be, and wherein the apparent size is represented by a portion of a spherical projection of a field of view of the user; and
    based at least in part on determining that the apparent size of the display area for at least one user of the plurality of users is smaller than a threshold display area size, modify a presentation of the content in the display area based on the apparent size of the display for the at least one user.

12. The system of claim 11, wherein the control circuitry is further configured to:
  determine a preference level for each user of the plurality of users;
  identify a preferred user having a highest determined preference level; and
  modify the presentation of the content in the display area based on the apparent size of the display area to the preferred user.

13. The system of claim 12, wherein the control circuitry is configured to determine the preference level for each user of the plurality of users by, for each user:
  identifying the user of the plurality of users by using facial recognition or by detecting a device associated with the user within a vicinity of the display device;
  accessing a user database comprising a plurality of entries, wherein each entry of the plurality of entries is associated with a different user of the plurality of users, and wherein each entry includes a preference level of a user corresponding to the entry; and
  retrieving an entry of the plurality of entries associated with the identified user.

14. The system of claim 12, wherein the preferred user is the at least one user of the plurality of users.

15. The system of claim 11, wherein the control circuitry is further configured to calculate the apparent size based at least in part on an arc length relative to the spherical projection of the field of view of the user.

16. The system of claim 11, wherein the control circuitry is configured to modify the presentation of the content in the display area by increasing the actual size of the content in the display area by modifying a zoom level of the content in the display area.

17. The system of claim 16, wherein an amount by which the zoom level is modified is inversely proportional to the apparent size of the content in the display area.

18. The system of claim 11, wherein the control circuitry is configured to modify the presentation of the content in the display area by:
  identifying a spatial portion of the content in the display area containing a current focus of the content; and
  generating for display the spatial portion of the content in the display area.

19. The system of claim 18, wherein the current focus of the content item comprises one of a character, an actor, a location, or an audio source.

20. The system of claim 11, wherein the control circuitry is configured to modify the presentation of the content in the display area by:
  determining an ambient brightness level of the content in the display area;
  comparing the ambient brightness level to a brightness threshold; and
  based at least in part on determining, based on the comparing, that the ambient brightness level is below the brightness threshold:
    increasing the ambient brightness level of the content in the display area.

* * * * *